(12) United States Patent
Christian

(10) Patent No.: US 12,449,627 B2
(45) Date of Patent: Oct. 21, 2025

(54) APPARATUS AND SYSTEM FOR HEADSET AND METHOD FOR USING HEADSET

(71) Applicant: Steven Christian, Reno, NV (US)

(72) Inventor: Steven Christian, Reno, NV (US)

( * ) Notice: Subject to any disclaimer, the term of this patent is extended or adjusted under 35 U.S.C. 154(b) by 532 days.

(21) Appl. No.: 17/931,040

(22) Filed: Sep. 9, 2022

(65) Prior Publication Data

US 2023/0070026 A1    Mar. 9, 2023

Related U.S. Application Data

(60) Provisional application No. 63/261,409, filed on Sep. 20, 2021, provisional application No. 63/261,057, filed on Sep. 9, 2021.

(51) Int. Cl.
*G02B 7/02* (2021.01)
*H05K 5/02* (2006.01)

(52) U.S. Cl.
CPC ........... *G02B 7/023* (2013.01); *H05K 5/0226* (2013.01)

(58) Field of Classification Search
None
See application file for complete search history.

(56) References Cited

U.S. PATENT DOCUMENTS

| | | | |
|---|---|---|---|
| 9,274,340 B2 | 3/2016 | Lyons | |
| 10,209,769 B2 | 2/2019 | Goossens et al. | |
| 2015/0234193 A1* | 8/2015 | Lyons | A63F 13/98 345/174 |
| 2016/0349509 A1 | 12/2016 | Lanier et al. | |
| 2017/0352187 A1 | 12/2017 | Haines | |
| 2018/0284454 A1 | 10/2018 | Reed | |
| 2019/0082169 A1* | 3/2019 | Goossens | G02B 27/0179 |
| 2020/0041800 A1 | 2/2020 | Haseltine et al. | |

FOREIGN PATENT DOCUMENTS

CN         212214000 U  * 12/2020

* cited by examiner

*Primary Examiner* — Phu Vu
(74) *Attorney, Agent, or Firm* — McCoy Russell LLP

(57) ABSTRACT

Systems and methods are provided for a viewing headset usable with a display device. In one example, the viewing headset includes a headset lens frame with a lens frame body that has a lens positioned therein and a front panel coupled to the lens frame body via a hinge, the hinge permitting rotation of the front panel within a predetermined angular range. The headset lens frame further includes a display attachment device coupled to the lens frame body and the front panel, the display attachment device configured to removably secure a display device to the front panel.

20 Claims, 11 Drawing Sheets

APPARATUS AND SYSTEM FOR HEADSET AND METHOD FOR USING HEADSET

CROSS REFERENCE TO RELATED APPLICATIONS

The present application claims priority to U.S. Provisional Application No. 63/261,409, entitled "APPARATUS AND SYSTEM FOR HEADSET AND METHOD FOR USING HEADSET", and filed on Sep. 20, 2021 and U.S. Provisional Application No. 63/261,057, entitled "APPARATUS AND SYSTEM FOR HEADSET AND METHOD FOR USING HEADSET", and filed on Sep. 9, 2021. The entire contents of the above-listed applications are hereby incorporated by reference for all purposes.

FIELD

The present description relates generally to systems and methods for a viewing headset, particularly for use with display devices.

BACKGROUND AND SUMMARY

Head-mounted display devices may be used for virtual reality (VR) or augmented reality (AR) applications, where VR applications may be defined by a fully simulated interactive display and AR applications may be defined by a partially simulated interactive display (where a remainder of the interactive display may include images fed to the display by a camera). However, costs for such head-mounted displays are typically high, especially for head-mounted displays providing satisfactory user experience. Further, such head-mounted displays may include bulky, heavy components, including components storing and executing software associated with the VR or AR applications.

One alternative, at least for AR applications, may include a handheld mobile device having the software associated with the AR applications installed thereon. Handheld mobile devices are ubiquitous and cost less than the head-mounted displays described above, in some cases. However, in using both hands to hold and operate such handheld mobile devices, user experience and immersiveness may be hampered. For example, certain AR applications may be enhanced by user manipulation of an external environment with their hands (e.g., moving objects, turning pages or holding a book, etc.). However, this type of user manipulation is not possible when a user is operating a handheld device with both hands.

In one example, the issues described above may be addressed by a viewing headset. The viewing headset includes a headset lens frame with a lens frame body that includes a lens positioned therein. The headset lens frame further includes a front panel coupled to the lens frame body via a hinge, the hinge permitting rotation of the front panel within a predetermined angular range. The headset lens frame further includes a display attachment device coupled to the lens frame body and the front panel, the display attachment device configured to removably secure a display device to the front panel. In this way, a viewing headset is provided that efficiently interfaces with a handheld device to provide a user with an immersive, hands free, and low cost viewing experience, if desired.

In some examples, the viewing headset may further include a secondary lens frame in which the lens may be positioned, the secondary lens frame slidably engaged with the lens frame body such that the lens may be slidably adjusted within the lens frame body. In additional or alternative examples, the lens frame body and the front panel may be independently formed from cardboard and/or a biodegradable plastic. In additional or alternative examples, no software may be installed on the headset and the headset may instead leverage software native to the display device, thereby readily accommodating display devices corresponding to a variety of software and hardware implementations (e.g., various smartphone and/or tablet computer form factors). In this way, the headset may function as a relatively adaptable, compact, affordable, lightweight, sturdy, and environmentally friendly viewing headset without sacrificing user experience.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a viewing headset configured to removably secure a display device, the display device being electrically and communicably independent from the viewing headset. Specifically, the viewing headset may include no software installed thereon nor any hardware for installing such software or for electrically or communicably coupling to the display device. In this way, the viewing headset may readily accommodate a wide range of display devices (e.g., mobile devices such as smartphones, tablet computers, and the like).

Figure 1:
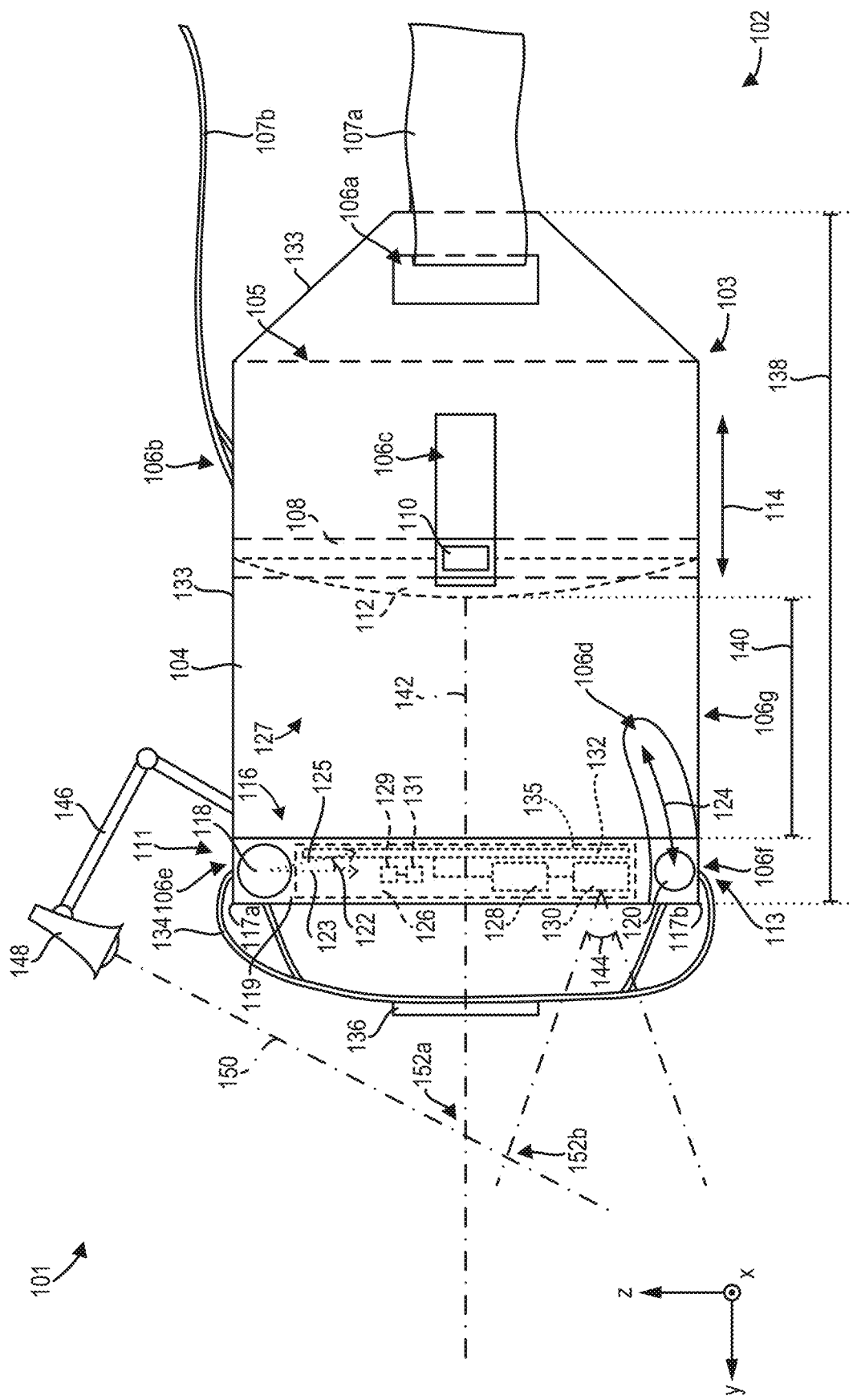
FIG. 1 shows a schematic side view of a first exemplary embodiment of a viewing headset for use with a display device.
Figure 2:
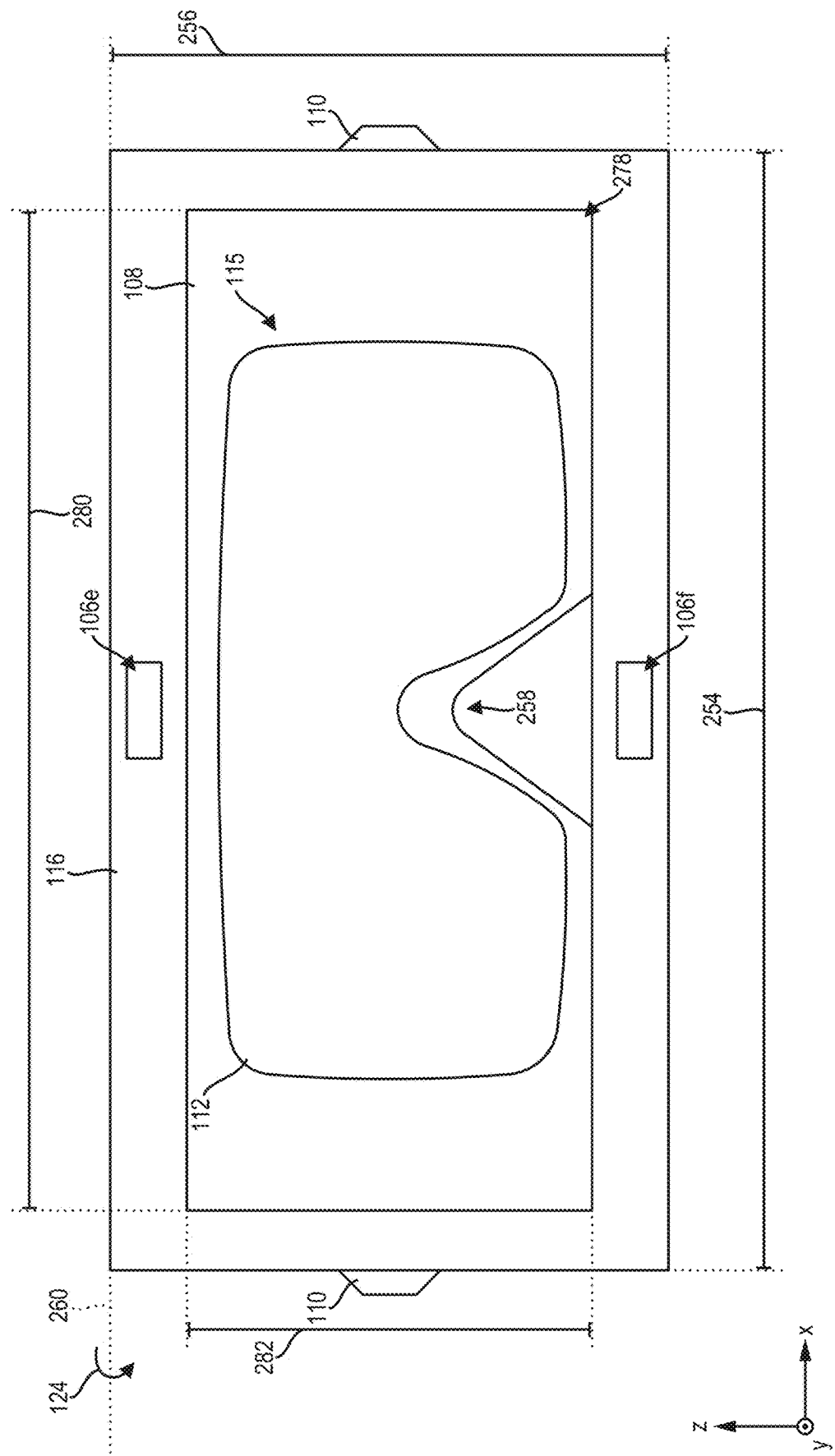
FIG. 2 shows a schematic front view of a front panel, a secondary lens frame, and a lens of the viewing headset of FIG. 1.
Figure 3:
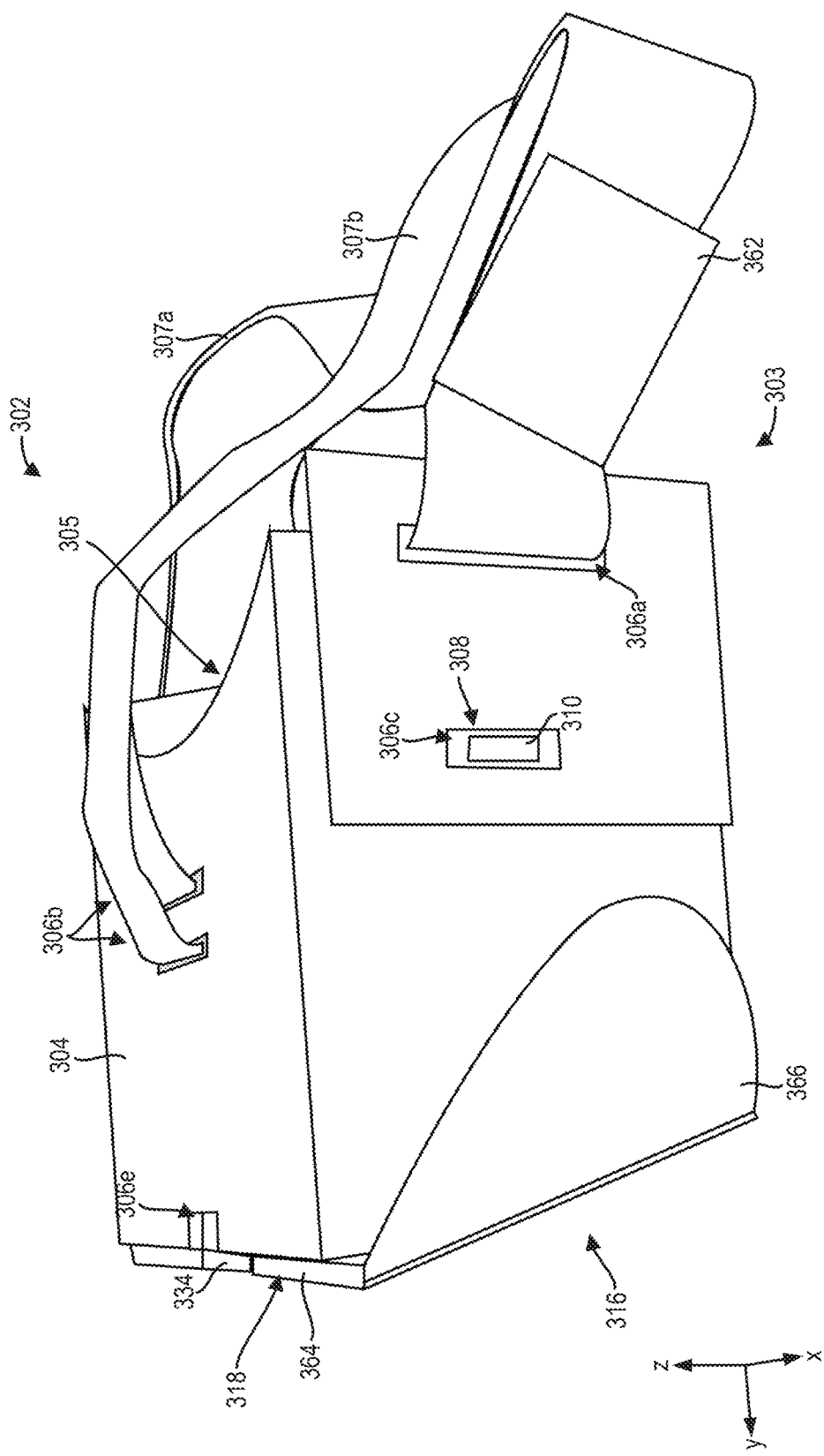
FIG. 3 shows a perspective view of a second exemplary embodiment of a viewing headset for use with a display device.
Figure 4A:
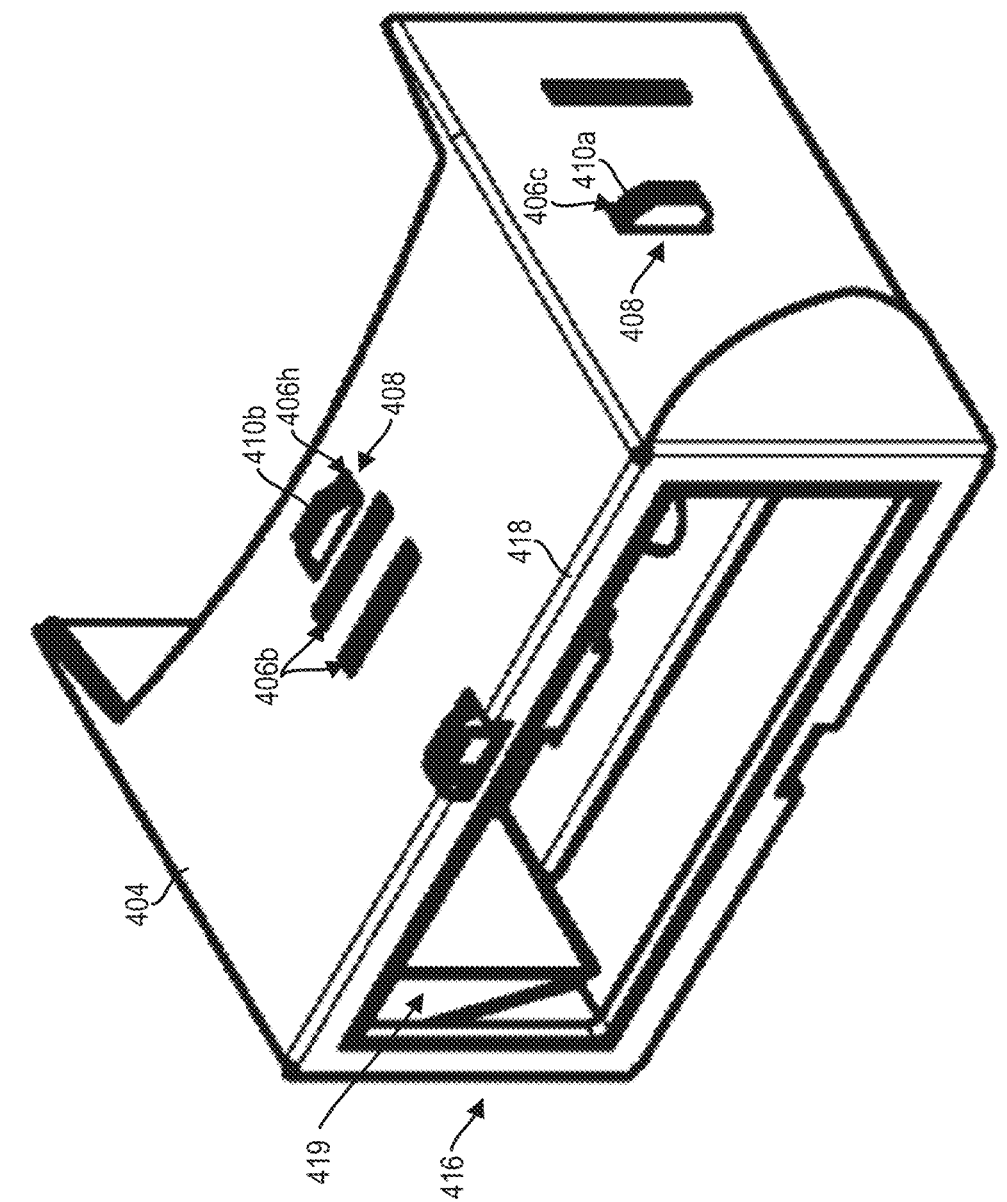
FIG. 4A shows a perspective view of a lens frame body and a front panel of a third exemplary embodiment of a viewing headset for use with a display device.
Figure 4B:
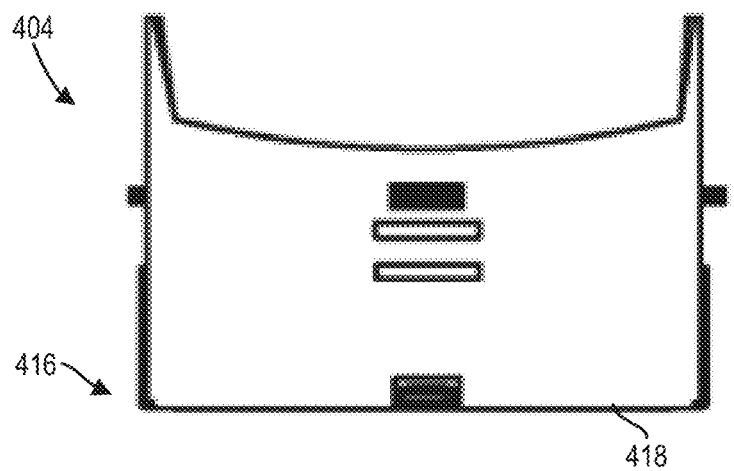
FIG. 4B shows a top view of the viewing headset of FIG. 4A.
Figure 4C:
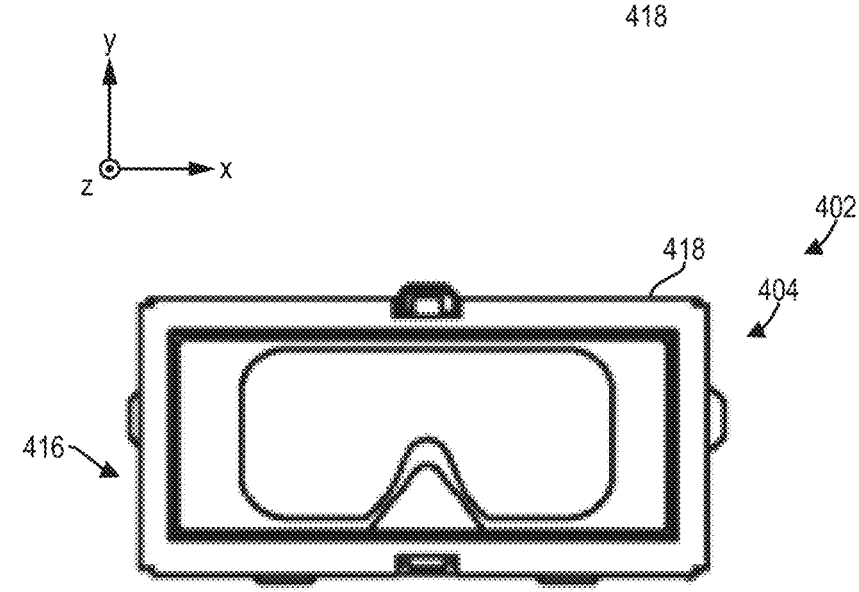
FIG. 4C shows a front view of the viewing headset of FIG. 4A.
Figure 4D:
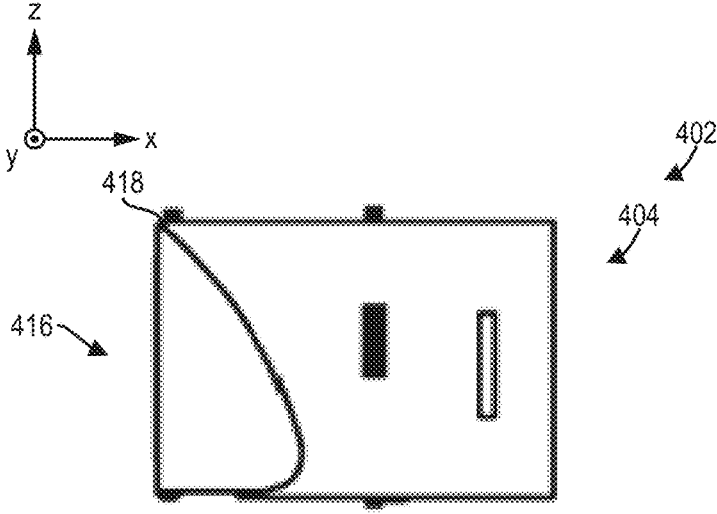
FIG. 4D shows a side view of the viewing headset of FIG. 4A.
Figure 5:
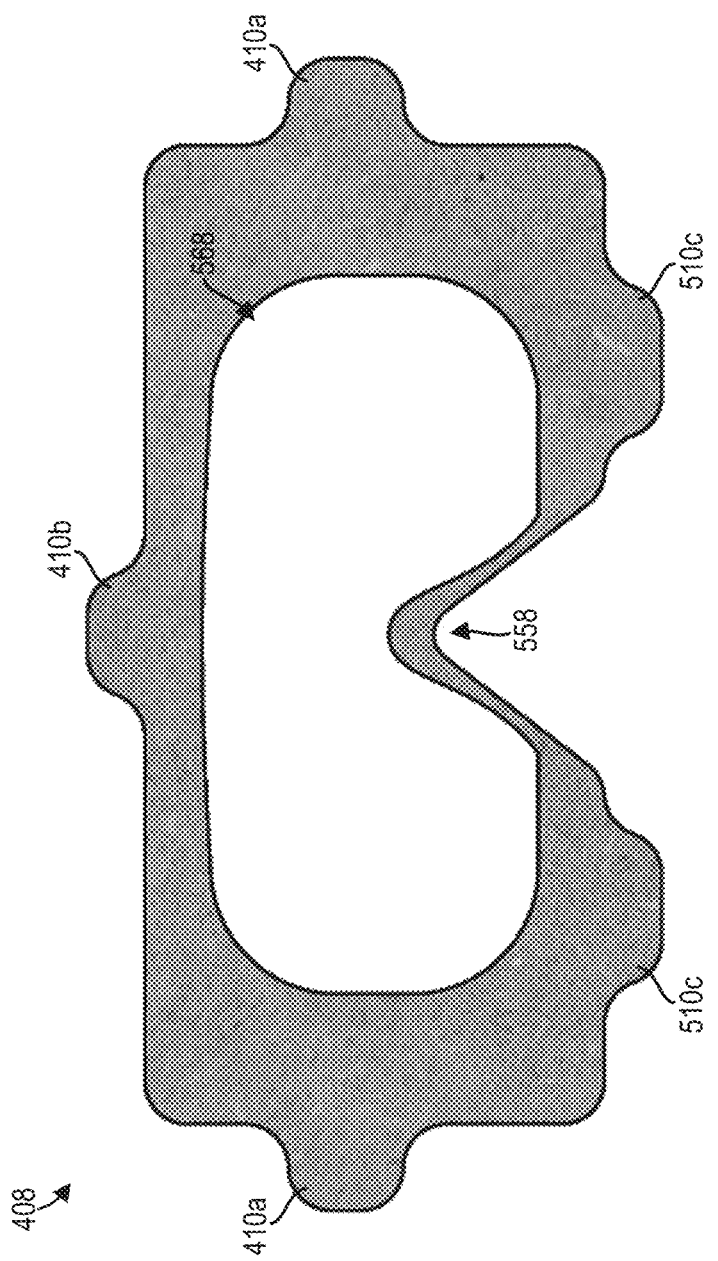
FIG. 5 shows a front view of a secondary lens frame of the viewing headset of FIG. 4A.
Figure 6:
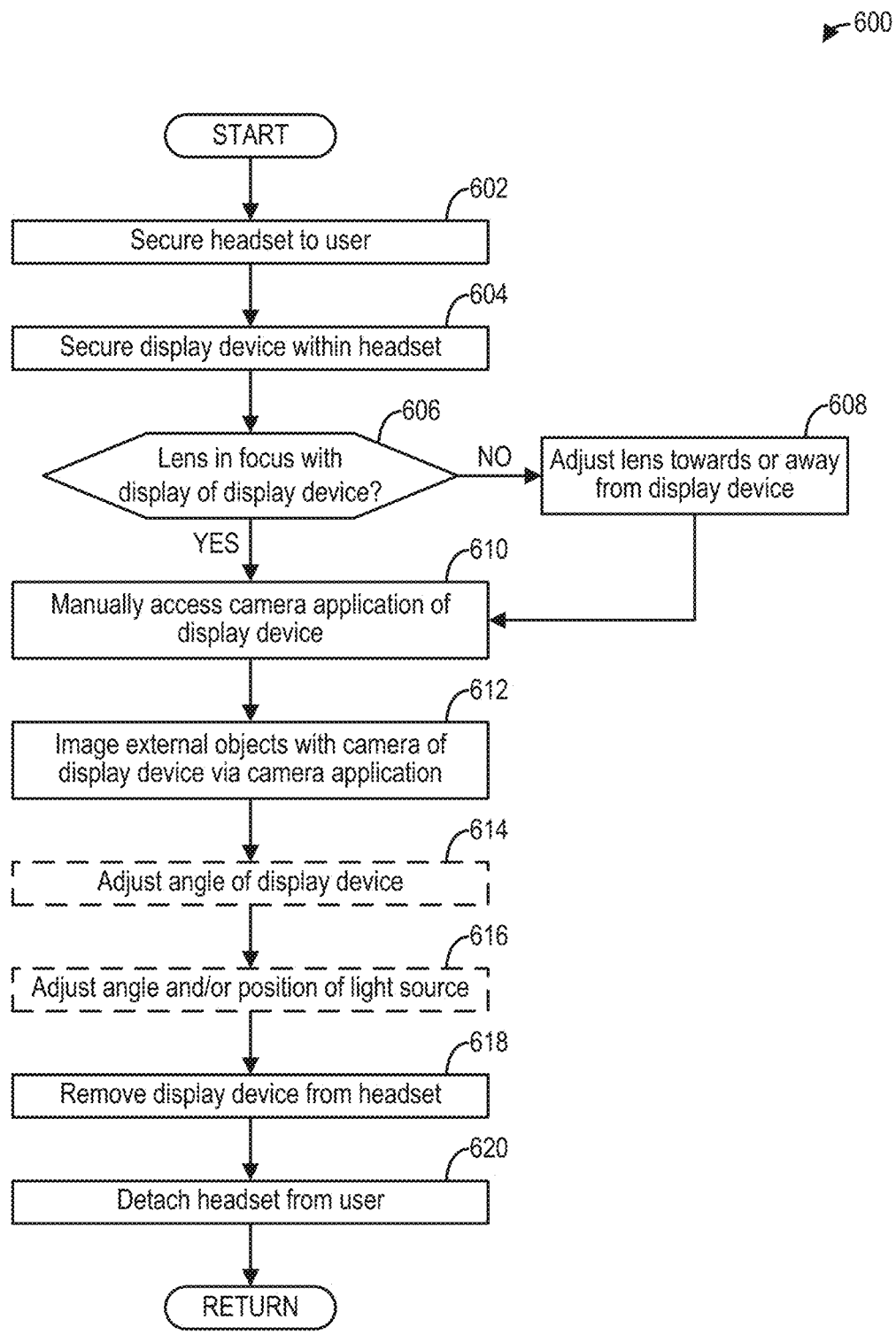
FIG. 6 shows a flow chart of a method for using a viewing headset with a display device secured therein.
Figure 7A:
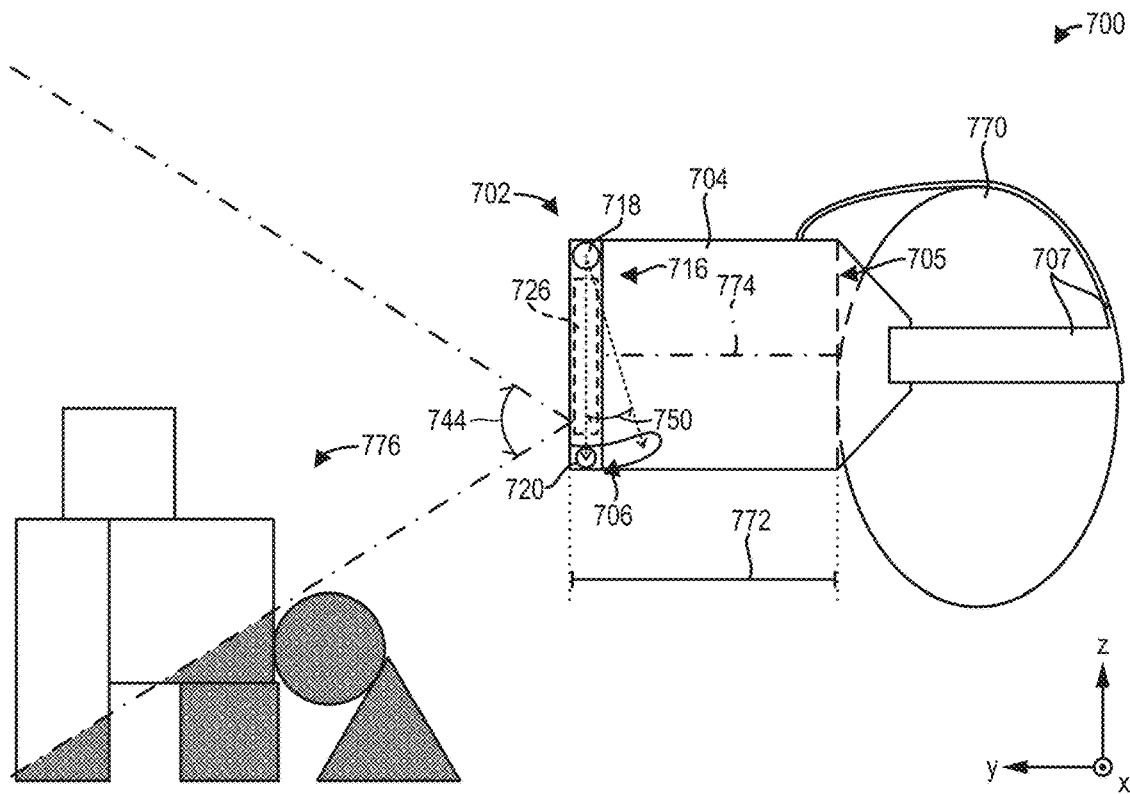
FIGS. 7A and 7B show schematic diagrams illustrating exemplary operation of a viewing headset in first and second positions, respectively.
Figure 7B:
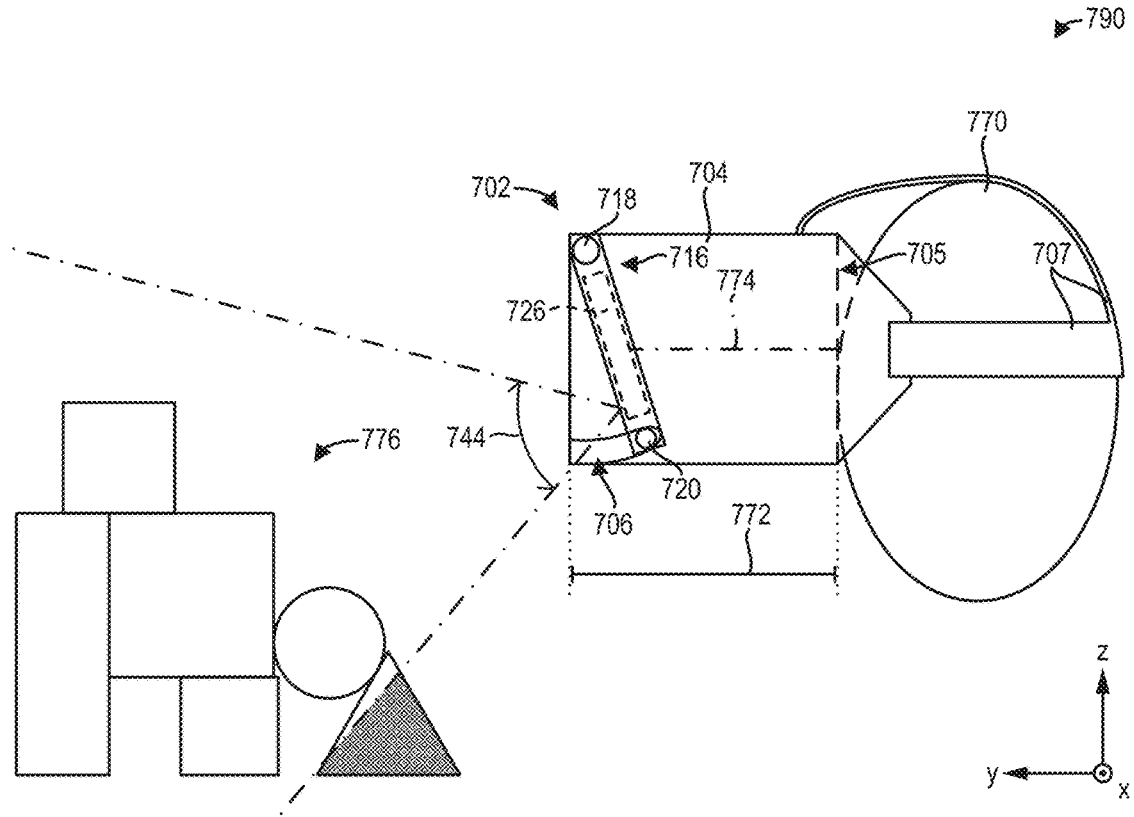
Figure 8A:
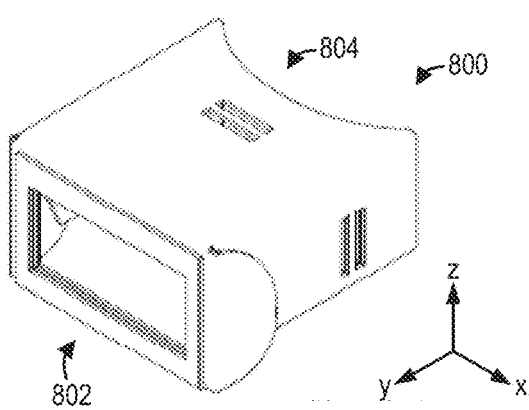
FIGS. 8A-8H show another embodiment of a viewing headset.
Figure 8E:
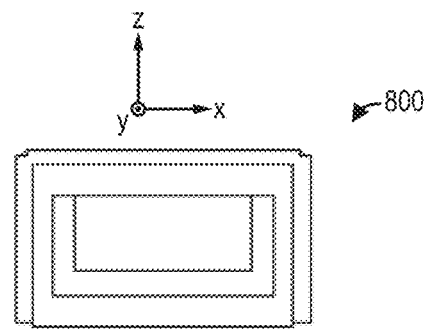
Figure 8B:
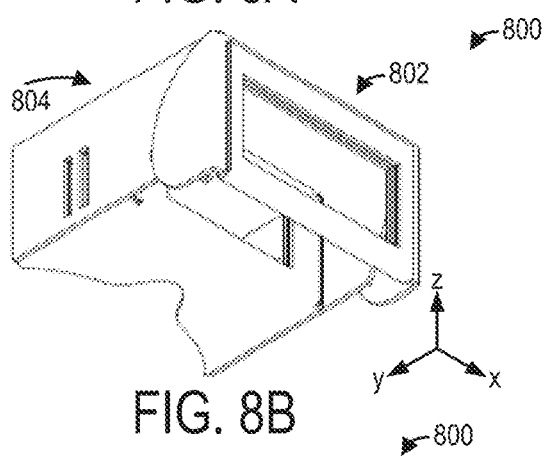
Figure 8F:
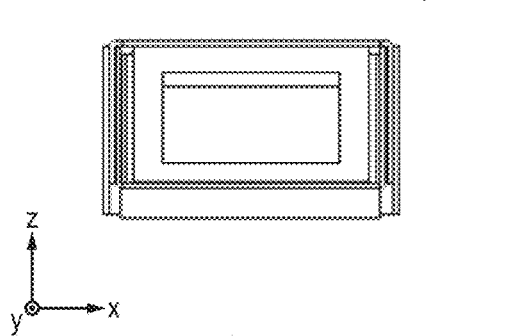
Figure 8C:
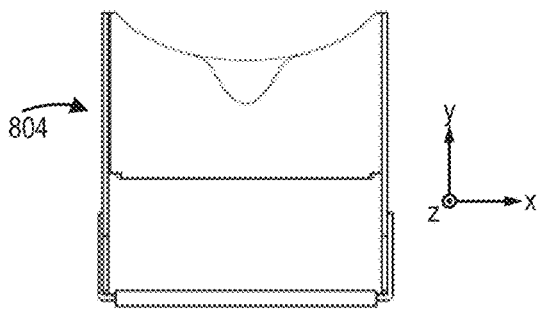
Figure 8G:
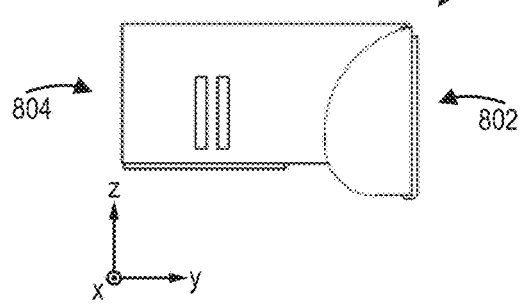
Figure 8D:
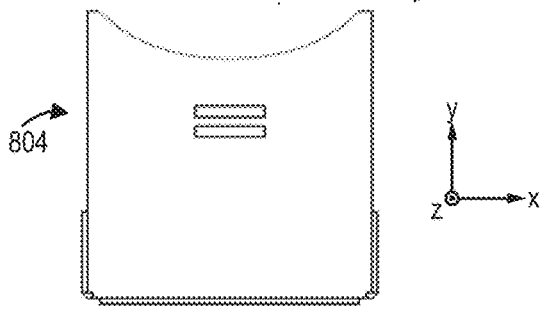
Figure 8H:
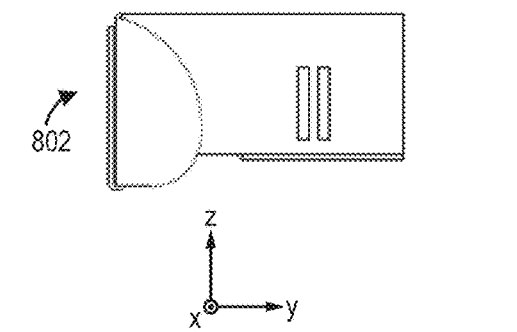
Figure 9A:
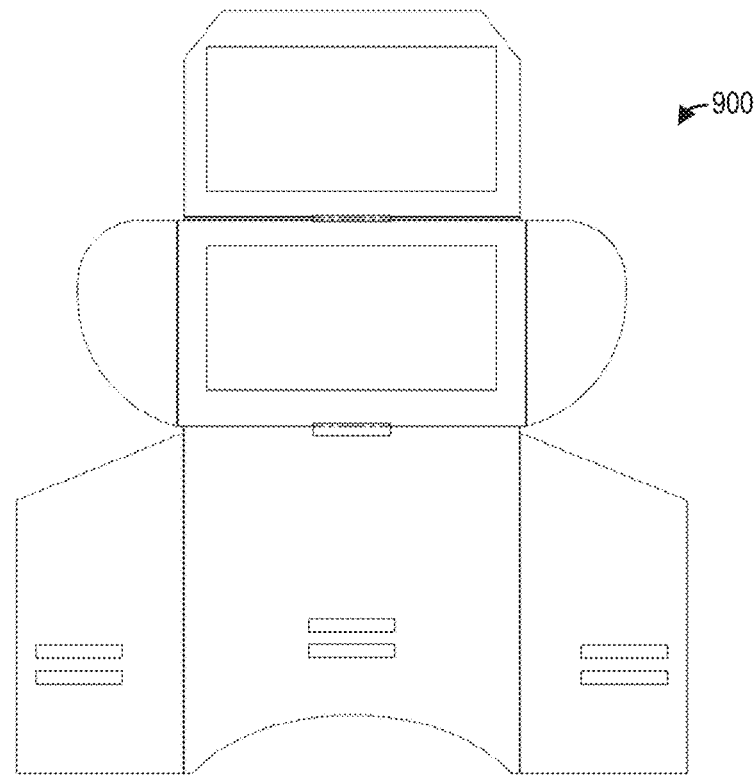
FIGS. 9A-9B show yet another embodiment of a front panel and a lens frame body of a viewing headset in unfolded configurations.
Figure 9B:
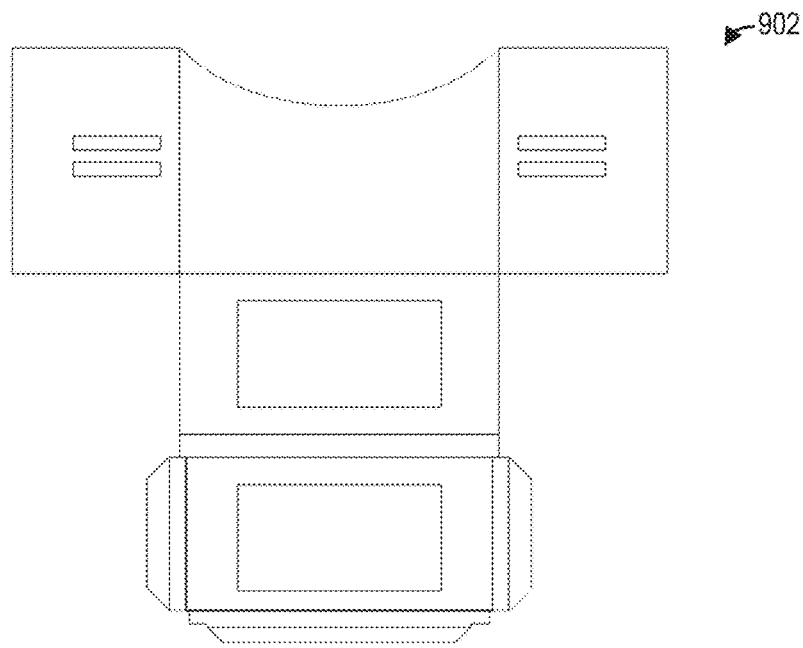

A first exemplary embodiment of the viewing headset is depicted in FIGS. 1 and 2, including a headset lens frame, the headset lens frame including a lens frame body and a front panel rotatably coupled to the lens frame body via a hinge. A front securement strap and/or other suitable display attachment device may be coupled to the lens frame body and the front panel, the front securement strap adjustable to secure any one of the range of display devices. A lens may be positioned within the lens frame body, the lens adjustable (e.g., slidably adjustable) via a secondary lens frame. A second exemplary embodiment of the viewing headset is depicted in FIG. 3, and aspects of a third exemplary embodiment of the viewing headset are depicted in FIGS. 4A-5. A method for using the viewing headset with a given display device is depicted in FIG. 6, including adjusting the viewing headset to adapt to the given display device and adjusting the given display device (once secured to the front panel of the viewing headset) to enhance user experience thereof. For example, and as depicted in FIGS. 7A and 7B, the front panel may be rotatably adjusted via the hinge between first and second positions such that a field of view of a camera of the given display device secured to the front panel may be correspondingly adjusted without altering a line of sight of a user of the viewing headset. In this way, the viewing headset and a position of the given display device may be adjusted to facilitate enhanced user experience and comfort. FIGS. 8A-8H show another viewing headset embodiment. FIGS. 9A-9B show yet another embodiment of a viewing headset.

Referring now to FIGS. 1 and 2, aspects of a first embodiment of a viewing headset 102 in a viewing headset system 101 are schematically depicted. Specifically, FIG. 1 depicts a schematic side view of the viewing headset 102 that includes a headset lens frame 103, a secondary lens frame 108 slidably engaged with the headset lens frame 103 (or otherwise movable relative to the headset lens frame 103), and a lens 112 positioned within the secondary lens frame 108. As shown, the headset lens frame 103 may include a lens frame body 104 and a front panel 116, the front panel 116 rotatably coupled to the lens frame body 104 via a hinge 118. The hinge 118 may be positioned on an upper side 111 of the front panel 116. Conversely, one or more protrusions 120, expanded upon in greater detail herein, may be positioned on a lower side 113 of the front panel. However, the hinge and protrusions may have other suitable arrangements, in other examples. For instance, the hinge may be arranged on the bottom side of the front panel and the protrusion may be positioned on the upper side of the front panel.

The hinge 118 may be a mechanical hinge that is designed with a predetermined resistance to rotation, in one example. In this way, the hinge may be maintained at a desired angle. Additionally or alternatively, the hinge may include or be coupled to a locking mechanism which allows the front panel to be locked in a desired location and prevent unwanted rotation of the front panel during headset use. In this way, the user's viewing experience is further enhanced.

FIG. 1 specifically depicts a side view and FIG. 2 depicts a front view of the front panel 116, the secondary lens frame 108, and the lens 112. It will be appreciated that components with similar configurations depicted in both FIGS. 1 and 2 may be labeled with corresponding numbers (e.g., the lens may be labeled with "112" with respect to each of FIGS. 1 and 2). A set of reference axes is provided for describing relative positioning of the components shown and for comparison between the views of FIGS. 1 and 2, the axes indicating an x-axis, a y-axis, and a z-axis. In one example, the z-axis may be parallel with a direction of gravity and a vertical direction of the viewing headset, the x-axis may be parallel with a horizontal (e.g., lateral) direction of the viewing headset, and the y-axis may be parallel with a transverse (e.g., longitudinal) direction of the viewing headset 102. The references axes are additionally provided in FIGS. 3-4D, 5, and 7A-8H.

As discussed above, the headset lens frame 103 includes a lens frame body 104. In some examples, the lens frame body 104 may be formed from panels of a material having sufficient sturdiness for repeated use of the viewing headset 102, yet light enough so as to mitigate discomfort to a user during a typical period of use (e.g., up to 3 hours, in one use-case example). In additional or alternative examples, the material may further be biodegradable (e.g., the material may meet a set standard for biodegradability, such as greater than 90% of the material may be fully mineralized into $CO_2$ within six months of composting the material). In one example, the material may be cardboard and/or a biodegradable plastic. In an exemplary embodiment, each of the secondary lens frame 108 and the front panel 116 may be formed of the material forming the lens frame body or another sufficiently sturdy, lightweight, and biodegradable material. For example, the lens frame body 104, the secondary lens frame 108, and the front panel 116 may independently be formed from cardboard and/or a biodegradable plastic. However, it will be appreciated that the material(s) forming the lens frame body 104, the secondary lens frame 108, and the front panel 116 may be constructed out of suitable material(s), including, but not limited to, cardboard and/or biodegradable plastic.

A rear panel 105 may be formed by the lens frame body 104. In an exemplary embodiment, the rear panel 105 may be configured as a perimeter or frame defining a rear central aperture, such that a user may look through the rear central aperture upon securement of the viewing headset 102 to the user. For instance, when the viewing headset 102 is secured to a head of the user via side and upper rear securement straps 107a and 107b, the rear panel 105 may circumferentially contact a face of the user around eyes of the user. In some examples, the rear panel 105 may be formed from a softer material than a remainder of the lens frame body 104 or additional cushioning may be provided at the rear panel 105, such that user comfort may be maintained when the viewing headset is secured to the head of the user.

The side rear securement strap 107a may be coupled to the lens frame body 104 via at least two openings 106a disposed within panels of the lens frame body 104 parallel with a plane formed by the y- and z-axes (e.g., one opening 106a may be disposed within a left panel of the lens frame body 104 and one opening 106a may be disposed within a right panel of the lens frame body 104, the left and right panels being located at opposite ends of the lens frame body 104 along the x-axis, the right panel being entirely obscured by the left panel in the schematic side view of FIG. 1). Similarly, the upper rear securement strap 107b may be coupled to the lens frame body 104 via at least two openings 106b disposed within a panel of the lens frame body 104 parallel with a plane formed by the x- and y-axes (e.g., two openings 106b may be disposed within an upper panel of the lens frame body 104, the upper panel being located at an uppermost end of the lens frame body 104 with respect to the z-axis). In some examples, the side and upper rear securement straps 107a and 107b may be coupled to one another, e.g., at a midpoint of the side rear securement strap 107a. In additional or alternative examples, one or both of the side and upper rear securement straps 107a and 107b may be coupled to one or more rear adjustment brackets, such that the side and upper rear securement straps 107a and 107b may be reversibly tightened and loosened.

As discussed above, the secondary lens frame 108 may be slidably engaged with the lens frame body 104. As shown in the schematic front view of FIG. 2, the secondary lens frame 108 may circumscribe the lens 112, such that the lens 112 may be positioned and secured within the secondary lens frame 108. In some examples, the secondary lens frame 108 may include an indentation 258 shaped for resting of the secondary lens frame 108 on a bridge of a nose of the user (additionally or alternatively, the indentation 258 may be shaped to provide a space for the nose of the user to extend, without the secondary lens frame 108 physically contacting the nose of the user).

In some examples, the secondary lens frame 108 may include one or more protrusions 110 that respectively extend through one or more openings 106c disposed within panels of the lens frame body 104. In one example, and as shown in FIGS. 1 and 2, one of the protrusions 110 may extend through one of the openings 106c disposed within the left panel of the lens frame body 104 and one of the protrusions 110 may extend through one of the openings 106c disposed within the right panel of the lens frame body 104 and opposite (with respect to the x-axis) to the one of the protrusions 110 extending through the one of the one or more openings 106c disposed within the left panel. When the secondary lens frame 108 is slidably adjusted as indicated via arrows 114 along the y-axis (e.g., parallel to a line of sight 142 of the viewing headset 102, which is coincident with an optical axis of the lens 112), each one of the protrusions 110 may abut against opposite ends of a corresponding one of the one or more openings 106c, which may limit the degree of slidable adjustment of the secondary lens frame 108 towards or away from the front panel 116 along the y-axis. It will be appreciated that, as constrained by the one or more openings 106c, slidable adjustment of the secondary lens frame 108 along the y-axis may include adjusting the secondary lens frame 108 among a substantially continuous set of positions, in one example. In other examples, the secondary lens frame may be adjusted into discrete positions. The term substantially may be used herein as a qualifier meaning "effectively," (e.g., a substantially continuous set may be used herein as meaning "a set which is effectively continuous for practical applications but may not be literally inclusive of infinitesimal adjustments"). In other embodiments, depending on the optical lens being used as the lens 112 and/or the sizing/shape of the secondary lens frame 108, other configurations may enable movement of the lens 112. For example, a series of pairs of openings 106c may be disposed in the left and right panels of the lens frame body 104, the openings 106c of the series of pairs of openings 106c spaced apart along the y-axis such that the secondary lens frame 108 may be adjusted in one of a corresponding series of discrete positions towards or away from the front panel 116 along the y-axis.

In an exemplary embodiment, and as shown in FIG. 2, the lens 112 may be positioned within one aperture 115 sized to accommodate at least a portion of each of a left field of vision of the user and a right field of vision of the user upon the viewing headset 102 being secured to the user (e.g., via the side and upper rear securement straps 107a and 107b), in that objects (e.g., images of the objects) within each of the left and right fields of vision may first be focused by the lens 112 prior to being observed by the user. In other embodiments, the lens 112 may be partitioned into two apertures respectively sized to accommodate the left and right fields of vision of the user upon the viewing headset 102 being secured to the user. In some examples, the lens 112 may be formed from glass or plastic (e.g., a biodegradable plastic), wherein the glass or the plastic may or may not magnify objects within a field of view of the lens 112.

As discussed above, the headset lens frame 103 may include the front panel 116 rotatably coupled to the lens frame body 104 via the hinge 118. The hinge 118 may be a separate component (e.g., a metallic or plastic hinge) from each of the lens frame body 104 and the front panel 116 or the hinge 118 may be integral to one or both of the lens frame body 104 and the front panel 116 (e.g., a fold between the lens frame body 104 and the front panel 116 when configured as a unitary piece). The hinge 118 may permit rotation as indicated via arc 124 of the front panel 116, e.g., within the line of sight 142 of the viewing headset 102, about a rotational axis 260 parallel to the x-axis, such that the line of sight 142 may continuously intersect with the front panel 116 ("continuously" in this context is defined by contradiction, in that the front panel 116 may not be rotated away from an intersection with the line of sight 142 and a display 132 of a display device 126 positioned in the front panel 116 may thereby be maintained within the line of sight 142). To elaborate, the line of sight 142 intersects an exterior surface 135 of the display 132. As such, the exterior surface 135 of the display 132 on which graphics are viewed faces the interior volume 127 of the viewing headset.

As shown, the rotational axis 260 may be coincident with or within a close proximity (e.g., within 1 centimeter (cm)) of a first edge 117a of the front panel 116 parallel to the x-axis. In an exemplary embodiment, the front panel 116 may be rotatable about the rotational axis 260 (e.g., via the hinge 118) between: a first position, in which a first viewing plane 123 of the front panel 116 is normal to each of the line of sight 142 of the viewing headset 102 and the optical axis of the lens 112 (e.g., parallel to a plane formed by the x- and z-axes); and a second position, in which a second viewing plane 125 of the front panel 116 forms an angle 122 with the first viewing plane 123 of the front panel 116 in the first position. The angle 122 may therefore be measured from a vertical plane and a plane of the front panel.

In one example, the angle 122 may be acute, such as 32° or less. As such, the hinge may be rotated within a range between 0° and 32°, in one example. The angle 122 may therefore be an angular range of adjustment (which may be referred to as a predetermined angular range) of the front panel 116 and therefore the display device 126. In this way, the front panel's position may be fined tuned according user's discretion but maintained within the line of sight of the headset to prevent the panel's angle adjustment from interrupting the user's viewing experience. In another example, the angle 122 may be 5° or less. Designing, the hinge 118 to rotate within this angular range may be particularly desirable when smaller display devices are used. The angular range of the hinge is expanded upon herein with regard to FIGS. 7A and 7B.

In an exemplary embodiment, a field of view 144 of a camera 130 of the display device 126 positioned within the front panel 116 may be correspondingly rotatably adjusted such that a greater number of external objects, or different external objects, may be imaged by the camera 130 (e.g., the camera 130 may image external objects which may be viewable when the front panel 116 is in the second position, but not when the front panel 116 is in the first position; see also FIGS. 7A and 7B). Moreover, the front panel 116 (and the field of view 144 therewith) may be rotatably adjusted (as indicated via the arc 124) without the user moving their head such that the field of view 144. The field of view 144 may be rotatably adjusted downwards with respect to the z-axis as, for example, the user may be more interested in imaging external objects below the line of sight 142 of the viewing headset 102, such as external objects resting on surfaces within an external or exterior environment of the user (e.g., on a table) or readily graspable/reachable/manipulable or already being held by the user (e.g., such as images or visual cues within a graphic novel or other book), than in imaging external objects within or above the line of sight 142. In some embodiments, the front panel 116 may be rotatably adjusted such that the field of view 144 may not overlap with the line of sight 142 (e.g., the field of view 144 may be entirely beneath the line of sight 142 with respect to the z-axis).

In some examples, the front panel 116 may include one or more protrusions 120 that respectively extend through one or more openings 106d disposed within panels of the lens frame body 104. In one example, one of the protrusions 120 may extend through one of the one or more openings 106d disposed within the left panel of the lens frame body 104 (as shown in FIG. 1) and one of the protrusions 120 may extend through one of the one or more openings 106d disposed within the right panel of the lens frame body 104 and opposite (with respect to the x-axis) to the one of the protrusions 120 extending through the one of the one or more openings 106d disposed within the left panel. When the front panel 116 is rotatably adjusted within the line of sight 142 of the viewing headset 102 (e.g., to the second position), each one of the protrusions 120 may abut against an end of a corresponding one of the one or more openings 106d, which may limit rotatable adjustment of the front panel 116 within the line of sight 142.

In an exemplary embodiment, and as shown in the schematic front view of FIG. 2, the front panel 116 may be configured as a perimeter or frame defining a front central aperture 278, such that the display 132 (a liquid-crystal display (LCD), a light-emitting diode (LED) display, and the like, which may be coupled to position or pressure sensors in a touchscreen configuration, in some examples of the display device 126 positioned in the front panel 116 may be visible to the user through the front central aperture 278 upon securement of the viewing headset 102 (e.g., via the side and upper rear securement straps 107a and 107b) and such that the camera 130 of the display device 126 may be entirely unobstructed by the front panel 116 so as to receive imaging data from an external environment. In other embodiments, the camera may be obstructed. As a non-limiting example, the front panel 116 may include a flat panel having no aperture, though it will be appreciated that the display 132 of the display device 126 may still be visible to the user upon securement of the viewing headset 102 to the user (e.g., the flat panel may be positioned behind the display 132 of the display device 126). In such embodiments, the camera 130 of the display device 126 may be covered by the flat panel of the front panel 116 and the display device 126 may be wirelessly coupled to an external camera.

In an exemplary embodiment, the front panel 116 may include a slot 119 contoured to receive the display device 126. Thus, the slot may be referred to as a display slot. In one such example, the display device 126 may be at least partially retained in position by the front panel 116 (e.g., such that translation along the x-, y-, and z-axes may be constrained when the display device 126 is positioned in the slot, the display device 126 being held in position and secured by the slot so as to not drop from the viewing headset 102).

Additionally or alternatively, a display attachment device 134 may be coupled to one or both of the lens frame body 104 and the front panel 116, the front securement strap 134 sized and positioned to removably secure the display device 126 to the front panel 116 (or within the slot of the front panel 116). The display attachment device is illustrated as a front securement strap, in the illustrated example. In such an example, the front securement strap may include hook and loop fabric and/or other suitable features for securing the strap in a desired positon after tightening or loosening the strap. Other types of display attachment devices may additional or alternatively be used in other embodiments. For instance, such as clamps, set screws, combinations thereof, and the like.

In an exemplary embodiment, the front securement strap 134 may be positioned such that, upon securing the display device 126 to the front panel 116 (e.g., in position within the slot), the front securement strap 134 may not cover or otherwise obscure the camera 130. The front securement strap 134 may be coupled to the lens frame body 104 and the front panel 116 at or within a close proximity (e.g., within 1 cm, in one use-case example) of the first edge 117a of the front panel 116 and further coupled to the front panel 116 at a second edge 117b of the front panel 116 parallel and opposite to the first edge 117a with respect to the z-axis. For instance, the front securement strap 134 may be coupled to each of the lens frame body 104 and the front panel 116 via at least two openings 106e disposed within a panel of the lens frame body 104 parallel with a plane formed by the x- and y-axes and the front panel 116 (e.g., one opening 106e may be disposed within the upper panel of the lens frame body 104 and one opening 106e may be disposed within a first side of the front panel 116 forming the first edge 117a with the upper panel of the lens frame body 104) and further coupled to the front panel 116 via one or more openings 106f disposed within the front panel 116 (e.g., one opening 106f may extend through the front panel 116 from a second side thereof to the first side, the second side forming the second edge 117b with the first side). In some examples, the front securement strap 134 may be coupled to a front adjustment bracket 136, such that the front securement strap 134 may be reversibly tightened and loosened.

In an exemplary embodiment, the user may utilize the viewing headset 102 to view the display 132 of the display device 126, the display device 126 being electrically and communicably decoupled from the viewing headset 102. Accordingly, in some examples, no software may be installed on the viewing headset 102, nor, in additional examples, may the software be installable on the viewing headset 102 (e.g., no hardware may be included in the viewing headset 102 on which to install such software). In this way, the software of the display device 126 may be leveraged to reduce a cost, a complexity, a compactness, and a weight of the viewing headset 102 relative to viewing headsets including software installed thereon.

Specifically, the display device 126 may be a mobile display device such as a cell phone, a smartphone, a tablet computer, and the like. In an exemplary embodiment, the (mobile) display device 126 may include a camera application 128 (e.g., on a controller of the display device 126) communicably coupled to each of the camera 130 (e.g., to send commands to the camera 130 and receive images and other data from the camera 130 in response) and the display 132 (e.g., to send the images and other data, as transformed or otherwise altered by the camera application 128, to the display 132). The camera application 128 may be executed as a set of instructions stored in a storage medium 129 (e.g., non-transitory memory) that is executable by a processor 131 include instructions in a non-transitory storage medium (e.g., memory) of the display device 126, the instructions executable to perform image recognition on images received at the camera 130 and thereafter display the images at the display 132. In some examples, performing image recognition may include recognizing, identifying, and/or altering external objects in the images received at the camera 130 and passed to the camera application 128. For example, the camera application 128 may include augmented reality (AR) or virtual reality (VR) functionality. Accordingly, the images displayed at the display 132 may depend on a position of the display device 126 (e.g., how the front panel 116 angles the display device 126), which in some examples may be inferred based on a gyroscope, accelerometer, or other position sensor included therein.

The viewing headset 102 may include an interior volume 127 housed by the lens frame body 104 and an opening 106g which extends from the interior volume to the external environment. Thus, the opening 106g allows air and light into the interior volume, in one example. The interior volume 127 may be formed via folds 133 and walls of the lens frame body 104 and/or the front panel 116. The folds in the lens frame body and the front panel are elaborated upon herein with regard to FIGS. 4E and 4F.

In some examples, a plane of the opening 106g being positioned parallel to and below the line of sight 142 of the viewing headset 102 and parallel to the plane formed by the x- and y-axes (e.g., the opening 106g may be disposed within a lower panel of the lens frame body 104, the lower panel being located at a lowermost end of the lens frame body 104 and opposite to the upper panel of the lens frame body 104 with respect to the z-axis). In an exemplary embodiment, the opening 106g may be located between the lens 112 and the front panel 116 with respect to the y-axis and sized to permit access of a stylus or at least one finger of the user to the interior volume. Specifically, the opening 106g may extend from the front panel 116 to the lens 112 when the secondary lens frame 108 is adjusted to position the lens 112 as close as possible to the front panel 116. Correspondingly, the lower panel may extend from the rear panel 105 to the lens 112 when the secondary lens frame 108 is adjusted to position the lens 112 as close as possible to the front panel 116. In other embodiments, the opening 106g may replace the lower panel of the lens frame body 104 entirely, such that no lower surface may be included in the lens frame body 104. In this way, when the viewing headset 102 is secured to the user and the display device 126 is secured to the front panel 116, the user may control the display device 126 (e.g., mechanical actuators, a touchscreen of the display 132, and the like) without detaching the viewing headset 102 or removing the display device 126 from the front panel 116.

In an exemplary embodiment, the various openings 106a, 106b, 106c, 106e, 106f, and 106g disposed within and extending through respective panels of the lens frame body 104 may have rectangular shapes (e.g., in planes parallel to the respective panels) and the one or more openings 106d disposed within and extending through respective panels of the lens frame body 104 may have arc-like shapes (e.g., in planes parallel to the respective panels). However, it will be appreciated that the shape of each of the various openings 106a, 106b, 106c, 106d, 106e, 106f, and 106g may be independently configured in rectangular, or in other polygonal shapes (e.g., besides rectangular shapes), or in circular, elliptical, or irregular shapes as desired for a given application. It will further be appreciated that the various openings 106a, 106b, 106c, 106d, 106e, 106f, and 106g may vary in size relative to one another and relative to the sizes depicted in FIGS. 1 and 2.

By selecting relatively lightweight materials for constructing various components of the viewing headset 102 and by omitting excess hardware (e.g., for installing software thereon), the viewing headset 102 may be formed in a relatively compact configuration. In some embodiments, the relatively compact configuration may be characterized by a length 138 of the lens frame body 104 parallel to the y-axis, a width 254 of the lens frame body 104 parallel to the x-axis, and a height 256 of the lens frame body 104 parallel to the z-axis. In some embodiments, each of the length 138, the width 254, and the height 256 may be approximately or substantially equal to one another (as used herein, "approximately" when referring to a numerical measurement of length/width/height may encompass a deviation of 1 cm or less). In other embodiments, two of the length 138, the width 254, and the height 256 may be approximately or substantially equal to one another, the other one of the length 138, the width 254, and the height 256 being greater or less than the two of the length 138, the width 254, and the height 256 approximately or substantially equal to one another. In other embodiments, each of the length 138, the width 254, and the height 256 may be different (e.g., appreciably greater or less) from one another. In an exemplary embodiment, the length 138 may be 8 cm or less, the width 254 may be 16 cm or less, and the height 256 may be 10 cm or less (e.g., sized for a broad range of users). For example, the length 138 may be approximately 5.5 to 6 cm, the width 254 may be approximately 15 cm, and the height 256 may be approximately 9 cm. In some embodiments, the lens frame body 104 may be sized for adults. In other embodiments, the lens frame body 104 may be sized for children (e.g., younger than 12), wherein each of the length 138, the width 254, and the height 256 of the lens frame body 104 sized for children may be respectively smaller than the length 138, the width 254, and the height 256 of the lens frame body 104 sized for adults. In one example, the headset lens frame 103 may have maximum dimensions of 18 cm (e.g., parallel to the y-axis)× 19 cm (e.g., parallel to the x-axis)×9 cm (e.g., parallel to the z-axis).

The front central aperture 278 may be characterized by a width 280 parallel to the x-axis and a height 282 parallel to the z-axis. In some embodiments, each of the width 280 and the height 282 may be approximately or substantially equal to one another. In other embodiments, each of the width 280 and the height 282 may be different (e.g., appreciably greater or less) from one another. In some embodiments, and as shown, the width 280 may be less than the width 254 and the height 282 may be less than the height 256. In an exemplary embodiment, the width 280 may be 17 cm and the height 282 may be 7 cm.

The lens 112 may be moved closer to or further from the front panel 116 (and thus closer to or further from the display 132) upon slidably adjusting (in the direction of arrows 114) the secondary lens frame 108 along the y-axis, such that the display 132 may be brought into and out of focus for the user. A position of the lens 112 may be characterized by an adjustable distance 140 between the lens 112 and the front panel 116. In some embodiments, the adjustable distance 140 may be 10 cm or less. As an example, the adjustable distance 140 may be 8 to 10 cm when the lens 112 is positioned furthest from the front panel 116. As another example, the adjustable distance 140 may be approximately 10 cm when the lens 112 is positioned furthest from the front panel 116. In one embodiment, the adjustable distance 140 may be approximately or substantially equal to the height 256. In other embodiments, the adjustable distance 140 may be fixed (e.g., at approximately 10 cm, in one use-case example).

In some embodiments, a light source 148 may be mechanically coupled to the viewing headset 102 via a light coupling 146. To elaborate, the light coupling 146 may be removably coupled to the viewing headset 102 and/or the light source 148. In one embodiment, the light coupling 146 may be detached from the light source 148 to replace a burned out or outmoded light source 148. In an additional or alternative embodiment, the light coupling 146 may be detached from the viewing headset 102 to remove cumbersome excess components, e.g., when sufficient ambient light is available in the external environment or when the display device 126 includes a light source sufficient to illuminate the external objects to be imaged.

When the light source 148 is mechanically coupled to the viewing headset 102, the light source 148 may be operable to emit light into the external environment so as to illuminate the external objects to be imaged. In some embodiments, the light coupling 146 may be extendable and/or rotatably adjustable such that the light source 148 may be variously positioned and/or angled to suit a given application (e.g., to illuminate specific external objects or areas of the external environment). In one embodiment, e.g., upon proper adjustment of the light coupling 146, beams 150 of the emitted light may intersect with the line of sight 142 of the viewing headset 102 at intersection 152a. In an additional or alternative embodiment, e.g., upon proper adjustment of the light coupling 146, the beams 150 may intersect with the field of view 144 of the camera 130 at intersection 152b.

Referring now to FIG. 3, aspects of a second embodiment of a viewing headset 302 are depicted. Specifically, FIG. 3 depicts a perspective view of the viewing headset 302 which includes a headset lens frame 303, a secondary lens frame 308 removably engaged with the headset lens frame 303, and a lens positioned within the secondary lens frame 308. As shown, the headset lens frame 303 may include a lens frame body 304 and a front panel 316, the front panel 316 rotatably coupled to the lens frame body 304 via a hinge 318.

It will be appreciated that at least some of the components of the viewing headset 302 having substantially similar function and/or structure to components of the viewing headset 102. Similar components may be labeled with corresponding numbers, prefixed with a "3" instead of a "1" or "2." For example, the lens frame body 304 may have a substantially similar function and/or structure to the lens frame body 104. Accordingly, only additional features of the viewing headset 302 or those features of the viewing headset 302 having significant configurational distinctions from corresponding features of the viewing headset 102 may be described in detail below; description of all other features of the viewing headset 302 may be supplemented by description of the corresponding features as provided in detail above with reference to FIGS. 1 and 2.

As discussed above, the headset lens frame 303 may include a lens frame body 304. In some examples, the lens frame body 304 may be formed from panels of a material having sufficient sturdiness for repeated use of the viewing headset 302, yet light enough so as to mitigate discomfort to a user during a typical period of use (e.g., up to 3 hours). In an exemplary embodiment, each of the secondary lens frame 308 and the front panel 316 may be formed of the material forming the lens frame body or another sufficiently sturdy, lightweight, and biodegradable material. For example, and as shown, the lens frame body 304, the secondary lens frame 308, and the front panel 316 may independently be formed from cardboard.

A rear panel 305 may be formed by the lens frame body 304. In an exemplary embodiment, the rear panel 305 may be configured as a perimeter or frame defining a rear central aperture, such that a user may look through the rear central aperture upon securement of the viewing headset 302 to the user. For instance, when the viewing headset 302 is secured to a head of the user via side and upper rear securement straps 307a and 307b, the rear panel 305 may circumferentially contact a face of the user around eyes of the user. As shown, the rear panel 305 may be curved or otherwise extended inwards along the y-axis so as to receive the head of the user.

The side rear securement strap 307a may be coupled to the lens frame body 304 via at least two openings 306a disposed within panels of the lens frame body 304 parallel with a plane formed by the y- and z-axes (e.g., one opening 306a may be disposed within a left panel of the lens frame body 304 and one opening 306a may be disposed within a right panel of the lens frame body 304, the left and right panels being located at opposite ends of the lens frame body 304 along the x-axis, the right panel being entirely obscured by other panels of the lens frame body 304 in the perspective view of FIG. 3). Similarly, the upper rear securement strap 307b may be coupled to the lens frame body 304 via at least two openings 306b disposed within a panel of the lens frame body 304 parallel with a plane formed by the x- and y-axes (e.g., two openings 306b may be disposed within an upper panel of the lens frame body 304, the upper panel being located at an uppermost end of the lens frame body 304 with respect to the z-axis). In some examples, and as shown, the side and upper rear securement straps 307a and 307b may be coupled to one another (e.g., at a midpoint of the side rear securement strap 307a). In additional or alternative examples, one or both of the side and upper rear securement straps 307a and 307b may be coupled to one or more rear adjustment brackets 362, such that the side and upper rear securement straps 307a and 307b may be reversibly tightened and loosened.

As discussed above, the secondary lens frame 308 may be removably engaged with the lens frame body 304. In some examples, the secondary lens frame 308 may include one or more protrusions 310 that respectively extend through one or more openings 306c disposed within panels of the lens frame body 304. In one example, one of the protrusions 310 may extend through one of the one or more openings 306c disposed within the left panel of the lens frame body 304 and one of the protrusions 310 may extend through one of the one or more openings 306c disposed within the right panel of the lens frame body 304 and opposite (with respect to the x-axis) to the one of the protrusions 310 extending through the one of the one or more openings 306c disposed within the left panel. In an additional or alternative example, one of the protrusions 310 may extend through one of the one or more openings 306c disposed within the upper panel of the lens frame body 304. In an additional or alternative example, at least one of the protrusions 310 may extend through at least one of the one or more openings 306c disposed within a lower panel of the lens frame body 304, the lower panel being located at a lowermost end of the lens frame body 304 and opposite to the upper panel of the lens frame body 304 with respect to the z-axis. The one or more openings 306c may be sized so as to respectively receive and fit the protrusions 310, thereby constraining relative movement of the secondary lens frame 308 and retaining the secondary lens frame 308 (and the lens positioned therein) in place.

As discussed above, the headset lens frame 303 may include the front panel 316 rotatably coupled to the lens frame body 304 via the hinge 318. In some examples, and as shown, the hinge 318 may be an integral fold between the lens frame body 304 and the front panel 316 (e.g., the lens frame body 304 and the front panel 316 may be a unitary piece). The hinge 318 may permit rotation of the front panel 316 within a targeted range, e.g., within the line of sight of the viewing headset 302, about a rotational axis parallel to the x-axis, such that the line of sight may continuously intersect with the front panel 316 ("continuously" in this context is defined by contradiction, in that the front panel 316 may not be rotated away from an intersection with the line of sight). In one example, the rotational axis may be coincident with the hinge 318 (e.g., the integral fold). In an exemplary embodiment, the front panel 316 may be rotatable about the rotational axis (e.g., via the hinge 318) between: a first position, in which a first viewing plane of the front panel 316 is normal to each of the optical axis of the lens and the line of sight of the viewing headset 302 (e.g., parallel to a plane formed by the x- and z-axes); and a second position, in which a second viewing plane of the front panel 316 forms an angle with the first viewing plane of the front panel 316 in the first position.

In some examples, the front panel 316 may include a central panel portion 364 foldably coupled to one or more side panel extensions 366. For example, and as shown, the one or more side panel extensions 366 may be folded at an approximately (e.g., within 5° of) 90° angle relative to the central panel portion 364, such that the one or more side panel extensions 366 may come into face-sharing contact with panels of the lens frame body 304. In one example, upon folding of the one or more side panel extensions 366 relative to the central panel portion 364, one of the one or more side panel extensions 366 may be positioned in face-sharing contact with the left panel of the lens frame body 304 and one of the one or more side panel extensions 366 may be positioned in face-sharing contact with the right panel of the lens frame body 304. In this way, the one or more side panel extensions 366 may be positioned such that excess ambient light may be prevented from entering an interior volume housed by the lens frame body 304 (which may otherwise obscure a display of a display device removably secured within the front panel 316). In some examples, and as shown, each of the one or more side panel extensions 366 may be shaped as a semicardioid (a half of a "heart shape"). However, it will be appreciated that the one or more side panel extensions 366 may be independently configured in other shapes (e.g., semicircles, semiellipsoids, polygons, irregular geometric shapes, and the like).

In some examples, a front securement strap 334 may be coupled to one or both of the lens frame body 304 and the front panel 316, the front securement strap 334 sized and positioned to removably secure a display device to the front panel 316 (or within a slot of the front panel 316). In an exemplary embodiment, the front securement strap 334 may be positioned such that, upon securing the display device to the front panel 316 (e.g., in position within the slot), the front securement strap 334 may not cover or otherwise obscure a camera of the display device. The front securement strap 334 may be coupled to the lens frame body 304 and the front panel 316 at the hinge 318 and further coupled to the front panel 316 at an edge of the front panel 316 parallel and opposite to the hinge 318 with respect to the z-axis. For instance, the front securement strap 334 may be coupled to each of the lens frame body 304 and the front panel 316 via at least two openings 306e disposed within a panel of the lens frame body 304 parallel with a plane formed by the x- and y-axes and the front panel 316 (e.g., one opening 306e may be disposed within the upper panel of the lens frame body 304 and one opening 306e may be disposed within an outer side of the front panel 316) and further coupled to the front panel 316 via one or more openings disposed within the front panel 316 adjacent to the edge of the front panel 316 opposite to the hinge 318 with respect to the z-axis (e.g., an opening may extend through the front panel 316 from an inner side thereof to the outer side). As used herein, "adjacent" may described any two components having no intervening components therebetween. In some examples, the front securement strap 334 may be coupled to a front adjustment bracket (e.g., the front adjustment bracket 136, shown in FIG. 1), such that the front securement strap 334 may be reversibly tightened and loosened.

Referring now to FIGS. 4A, 4B, 4C, 4D, and 5, aspects of a third embodiment of a viewing headset 402 are depicted. Specifically, FIG. 4A-4D depict a lens frame body 404 and a front panel 416, each of the lens frame body 404 and the front panel 416 included in a headset lens frame of the viewing headset. As shown, the front panel 416 may be rotatably coupled to the lens frame body 404 via a hinge 418. Further, FIG. 4A specifically illustrates a slot 419 profiled to receive a display device as well as openings 406b designed to receive a securement strap which is profiled to fit around a wearer's head.

In an exemplary embodiment, a secondary lens frame 408 may be removably engaged with the lens frame body 404, a lens positioned within the secondary lens frame 408. FIG. 5 depicts a front view of the secondary lens frame 408. It will be appreciated that components with similar configurations depicted in FIGS. 4A-5 may be labeled with corresponding numbers (e.g., the secondary lens frame may be labeled with "408" with respect to FIGS. 4A-5).

It will be appreciated that components of the lens frame body 404, the secondary lens frame 408, the front panel 416, and the hinge 418 having substantially similar function to components of the lens frame body 104, the secondary lens frame 108, the front panel 116, and the hinge 118 or the lens frame body 304, the secondary lens frame 308, the front panel 316, and the hinge 318 may be labeled with corresponding numbers, prefixed with a "4" or "5" instead of a "1," "2," or "3." As an example, the lens frame body 404 may have a substantially similar function to the lens frame body 104 and/or the lens frame body 304. As another example, an indentation 558 may have a substantially similar function to the indentation 258. Accordingly, only additional features of the lens frame body 404, the secondary lens frame 408, the front panel 416, and the hinge 418 or those features of the lens frame body 404, the secondary lens frame 408, the front panel 416, and the hinge 418 having significant configurational distinctions from corresponding features of the lens frame body 104, the secondary lens frame 108, the front panel 116, and the hinge 118, respectively, or the lens frame body 304, the secondary lens frame 308, the front panel 316, and the hinge 318, respectively, may be described in detail below; description of all other features of the lens frame body 404, the secondary lens frame 408, the front panel 416, and the hinge 418 may be supplemented by description of the corresponding features as provided in detail above with reference to FIGS. 1-3.

As discussed above, the secondary lens frame 408 may be removably engaged with the lens frame body 404. In some examples, the secondary lens frame 408 may include one or more side protrusions 410a that respectively extend through one or more openings 406c disposed within panels of the lens frame body 404. In one example, one of the protrusions 410a may extend through one of the one or more openings 406c disposed within an left panel of the lens frame body 404 and one of the protrusions 410a may extend through one of the one or more openings 406c disposed within an right panel of the lens frame body 404 and opposite (with respect to the x-axis) to the one of the protrusions 410a extending through the one of the one or more openings 406c disposed within the left panel, the left and right panels being located at opposite ends of the lens frame body 404 along the x-axis, the right panel being entirely obscured by other panels in the perspective view of FIG. 4A. In additional or alternative examples, the secondary lens frame 408 may include one or more upper protrusions 410b that respectively extend through one or more openings 406h disposed within panels of the lens frame body 404. In one example, one of the protrusions 410b may extend through one of the one or more openings 406h disposed within an upper panel of the lens frame body 404, the upper panel being located at an uppermost end of the lens frame body 304 with respect to the z-axis. In additional or alternative examples, and as shown in the front view of FIG. 5, the secondary lens frame 408 may include one or more lower protrusions 510c that respectively extend through one or more openings disposed within panels of the lens frame body 404. In one example, two of the one or more lower protrusions 510c may extend through two openings disposed within a lower panel of the lens frame body 404, the lower panel being located at a lowermost end of the lens frame body 404 and opposite to the upper panel of the lens frame body 404 with respect to the z-axis. The one or more openings 406c (e.g., in the left and right panels of the lens frame body 404) may be sized so as to respectively receive and fit the one or more side protrusions 410a, the one or more openings 406h (e.g., in the upper panel of the lens frame body 404) may be sized so as to respectively receive and fit the one or more upper protrusions 410b, and one or more openings (e.g., the two openings in the lower panel of the lens frame body 404) may be sized so as to respectively receive and fit the one or more lower protrusions 510c, thereby constraining relative movement of the secondary lens frame 408 and retaining the secondary lens frame 408 (and the lens positioned therein) in place. In some examples, a relatively high number (e.g., five in one use-case example) of protrusions 410a, 410b, and 510c may permit more secure positioning of the secondary lens frame 408 when the protrusions 410a, 410b, and 510c are received by respective openings (e.g., 406c, 406h, etc.) of the lens frame body 404 than in examples wherein fewer protrusions 410a, 410b, and 510c are included in the secondary lens frame 408.

As discussed above, the secondary lens frame 408 may be removably engaged with the lens frame body 404. As shown in the front view of FIG. 5, the secondary lens frame 408 may circumscribe an aperture 568 within which the lens may be positioned and secured. In an exemplary embodiment, the aperture 568 may be sized to accommodate at least a portion of each of a left field of vision of a user and a right field of vision of the user upon the viewing headset being secured to the user (e.g., via rear securement straps), the lens positioned within the aperture 568 such that objects (e.g., images of the objects) within each of the left and right fields of vision may first be focused by the lens prior to being observed by the user. In other embodiments, the lens may be partitioned into two apertures 568 respectively sized to accommodate the left and right fields of vision of the user upon the viewing headset being secured to the user.

Figure 4E:
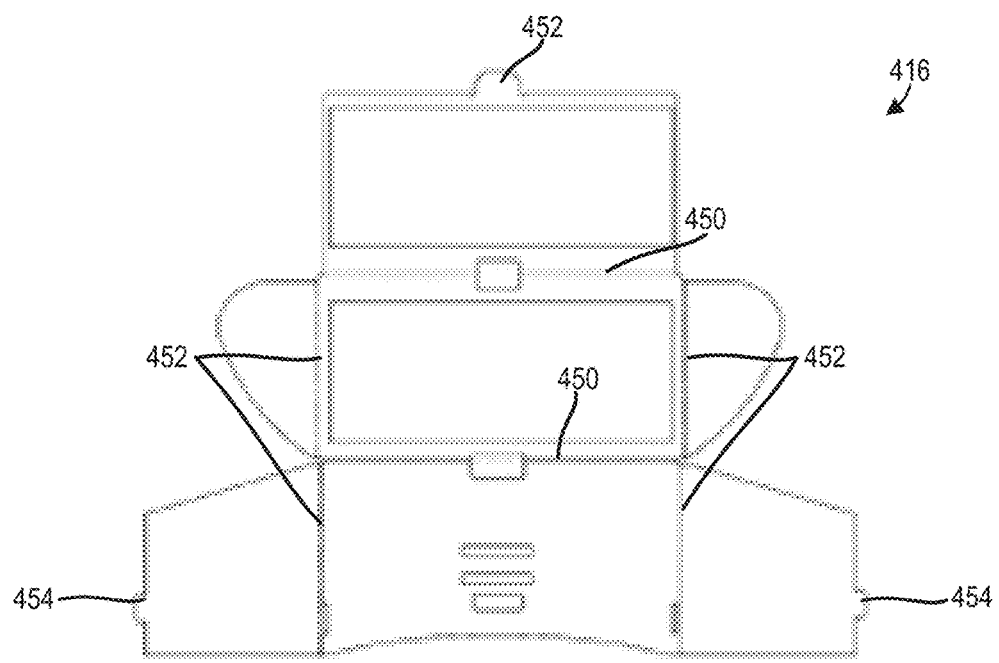
FIG. 4E shows a front panel in the viewing headset of FIG. 4A in an unfolded configuration.
Figure 4F:
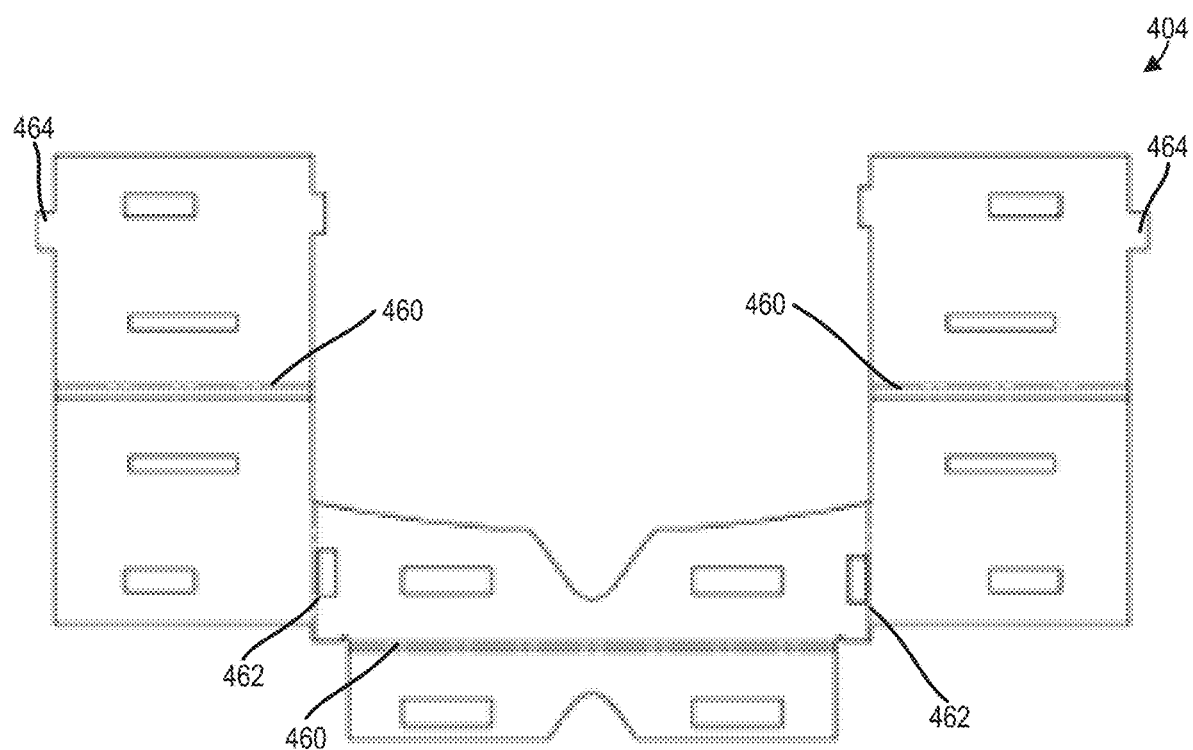
FIG. 4F shows a lens frame body of the viewing headset of FIG. 4A in an unfolded configuration.

FIGS. 4E and 4F depict the front panel 416 and the lens frame body 404 in their unfolded configuration prior to final construction of the viewing headset. As previously discussed, the front panel and lens frame body may be constructed out of sturdy, yet lightweight, biodegradable materials (e.g., cardboard, biodegradable plastics, and the like) which permits folding of the material. In this way, the viewing headset may be efficiently assembled and manufactured at a lower cost than bulky head-mounted displays.

Turning specifically to FIG. 4E in which the front panel 416 is illustrated with multiple folds. The folds may be in the form of creases that allow sections of the panel to be angularly positioned in relation to other sections to form the viewing headset profile depicted in FIG. 4A. The folds shown in FIG. 4E may be demarcated into horizontal folds 450 and longitudinal folds 452. Tabs 454 and 456 in the front panel 416 are further depicted in FIG. 4E. However, other front panel configurations have been envisioned such as a panel with additional or alternative tabs.

FIG. 4F shows the lens frame body 404 with horizontal folds 460 and vertical folds 462. Tabs 464 in the lens frame body 404 are further depicted in FIG. 4F. However, the tabs may have different locations or be omitted, in alternate embodiments.

Referring now to FIG. 6, a flow chart depicting a method 600 for using a viewing headset to view and operate a display device secured therein is shown. In some examples, the viewing headset may be any one or a combination of the embodiments of the viewing headset provided herein. For example, the viewing headset may correspond to one of the first exemplary embodiment of the viewing headset (e.g., the viewing headset 102) as described in detail above with reference to FIGS. 1 and 2, the second exemplary embodiment of the viewing headset (e.g., the viewing headset 302) as described in detail above with reference to FIG. 3, and the third exemplary embodiment of the viewing headset, at least some components of which are described in detail above with reference to FIGS. 4A-5, or the viewing headset may include a combination of features, elements, and components from the first, second, and third exemplary embodiments. Accordingly, the viewing headset may include a headset lens frame including a secondary lens frame having a lens positioned therein, the secondary lens frame adjustable (e.g., slidably adjustable) towards or away from the front panel such that the lens may be adjusted in focus with a display of the display device. The headset lens frame may further include a front panel configurable to secure the display device therein or thereto, the front panel rotatably adjustable such that different or additional external objects may be imaged by a camera of the display device (e.g., rotatable adjustment of the front panel may correspondingly rotatably adjust a field of view of the camera). In some examples, a light source may be mechanically coupled to the headset lens frame, the light source adjustable (e.g., rotatably and/or translatably adjustable) such that external objects within the field of view of the camera of the display device may be imaged with increased clarity. In this way, an increased number of external objects may be viewed by a user of the viewing headset (e.g., at the display of the display device) while maintaining or improving user experience and comfort. It will be appreciated that steps of method 600 indicated in the flow chart of FIG. 6 in dashing may be optional. For example, because the front panel and/or light source may already be adjusted as desired prior to imaging the external objects with the camera of the display device, 614 and 616 may be optional and are correspondingly indicated in dashing. It will be understood that the method steps may be at least partially implemented by a user.

At 602, method 600 includes securing the viewing headset to the user. Specifically, the viewing headset may be secured to the user via one or more rear securement straps, the one or more rear securement straps adjustably sized to a head of the user.

At 604, method 600 includes securing the display device within the viewing headset. Specifically, the display device may be secured to the front panel or within a slot thereof via a front securement strap, the front securement strap positioned so as not to obstruct the field of view of the camera of the display device. Upon securement, the display device may be positioned in a line of sight of the user such that a display of the display device may be viewable while the viewing headset remains secured to the user. In an exemplary embodiment, the display device may be a mobile display device, such as a smartphone or a tablet computer. Accordingly, in such an embodiment, the viewing headset may be unencumbered by wires or other couplings of the display device to an external power source.

At 606, method 600 includes determining whether or not the lens is in focus with the display of the display device. If the lens is out of focus with the display of the display device, method 600 proceeds to 608, where method 600 may include adjusting the lens towards or away from the display device to bring the display of the display device into focus for the user. In an exemplary embodiment, adjusting the lens may include slidably adjusting the secondary lens frame (and the lens therewith) towards or away from the display device via protrusions of the secondary lens frame slidably engaged with respective openings disposed within the headset lens frame.

If the lens is in focus with the display of the display device (e.g., whether the lens is already in focus at 606 or the lens has been adjusted to be in focus at 608), method 600 proceeds to 610, where method 600 includes manually accessing a camera application of the display device. Specifically, manually accessing the camera application may include controlling a touchpad, a display with position or pressure sensors integrated therein (e.g., a touchscreen), or one or more mechanical actuators (e.g., rotatable dials, depressible switches, and the like) with a stylus or a finger inserted within an interior volume of the headset lens frame via a lower opening disposed in the headset lens frame.

The camera application may be communicably coupled to the camera, whereby the camera application may send commands to the camera and receive images and other data from the camera in response. For example, at 612, method 600 may include imaging external objects with the camera of the display device via the camera application. The camera application may include executable instructions stored in a non-transitory storage medium (e.g., memory) of the display device. The executable instructions may be carried out via a controller of the display device such that the camera may be controlled via the camera application. In an exemplary embodiment, the camera application may include AR functionality. For instance, the instructions may be executable to perform image recognition on images received at the camera of the display device. Specifically, the images may be passed to the camera application, whereat imaged external objects may be identified and stored, e.g., as manipulable data structures. The imaged external objects, along with any data associated therewith (e.g., labels, arrows, boxes surrounding the imaged external objects, information concerning the imaged external objects, actuatable icons, and the like), may be displayed at the display of the display device.

At 614, method 600 may include adjusting an angle of the display device. Specifically, adjusting the angle of the display device may include rotatably adjusting the front panel relative to each of the lens and the user (since the display device may be secured to or within the front panel). The angle of the display device may be adjusted as desired by the user, such that the camera of the display device may image different or additional external objects recognizable by the camera application of the display device and thereby increase a number of external objects recognizable by the camera application.

At 616, method 600 may include adjusting an angle and/or a position of a light source mechanically coupled to the headset lens frame. Specifically, adjusting the angle and/or the position of the light source may include rotatably and/or extendably adjusting the light source relative to the headset lens frame. The angle and/or the position of the light source may be adjusted as desired by the user, such that different or additional external objects may be illuminated, imaged by the camera of the display device, and recognized by the camera application of the display device, thereby increasing the number of external objects recognizable by the camera application.

At 618, method 600 may include removing the display device from the viewing headset, e.g., responsive to a period or session of use elapsing. Specifically, the display device may be removed or otherwise unsecured from the front panel (e.g., by loosening the front securement strap).

At 620, method 600 includes detaching the viewing headset from the user. Specifically, the viewing headset may be detached or otherwise unsecured from the head of the user (e.g., by loosening the one or more rear securement straps).

Referring now to FIGS. 7A and 7B, schematic diagrams 700 and 790 depicting exemplary operation of a viewing headset 702 in first and second positions are respectively shown. In some examples, the viewing headset 702 may be any one or a combination of the embodiments of the viewing headset provided herein. For example, the viewing headset 702 may correspond to one of the first exemplary embodiment of the viewing headset (e.g., the viewing headset 102) as described in detail above with reference to FIGS. 1 and 2, the second exemplary embodiment of the viewing headset (e.g., the viewing headset 302) as described in detail above with reference to FIG. 3, and the third exemplary embodiment of the viewing headset, at least some components of which are described in detail above with reference to FIGS. 4A-5, or the viewing headset 702 may include a combination of features, elements, and components from the first, second, and third exemplary embodiments.

As shown in the schematic diagram 700 of FIG. 7A, the viewing headset 702 may be secured to a user 770 via one or more rear securement straps 707 such that a line of sight of the user 770 may coincide with a line of sight of the viewing headset 702 (the coincident lines of sight indicated by a line 774 parallel to the y-axis) and a rear panel 705 of a lens frame body 704 of the viewing headset 702 may come into contact with a face of the user 770. A display device 726 may be secured to or within a front panel 716 of the viewing headset such that a display of the display device 726 may be within the line of sight of the user 770 when the viewing headset 702 is in the first position. The display device 726 may include a camera which may image one or more of a plurality of external objects 776 which are within a field of view 744 of the camera. In the schematic diagram 700, one external object 776 is completely within the field of view 744, two external objects 776 are partially within the field of view 744, and three external objects 776 are entirely outside of the field of view 744.

The front panel 716 may be rotatably coupled to the lens frame body 704 via a hinge 718 so as to be rotatably adjustable relative to the lens frame body 704. The hinge 718 enables the front panel 716 to rotate within angular range 750. As indicated above the angular range may be between 0° and 32°, in one example, or 0° and 5°, in another example.

In an exemplary embodiment, the front panel 716 may include protrusions 720 respectively engaged with one or more openings 706. In an exemplary embodiment, the viewing headset 702 may be moved from the first position to the second position by rotatably adjusting the front panel 716 via the hinge 718 until each of the protrusions 720 abuts an end of a respective one of the one or more openings 706 (as shown in the schematic diagram 790 of FIG. 7B). As shown, even when the viewing headset 702 is in the second position, the display of the display device 726 may remain within the line of sight of the user 770 (e.g., line 774). However, because the display device 726 may be rotatably adjusted with the front panel 716, the field of view 744 of the camera of the display device 726 may be altered and different or additional external objects 776 may fall within the field of view 744. In the schematic diagram 790, five external objects 776 are completely within the field of view 744, one external object 776 is partially within the field of view 744, and no external objects 776 are entirely outside of the field of view 744.

As is apparent from comparing the schematic diagrams 700 and 790, whether the viewing headset 702 is in the first position or the second position, the user 770 may remain stationary. Accordingly, an increased number of external objects 776 may be imaged by the camera of the display device 726 when the viewing headset 702 is adjusted from the first position to the second position without the user 770 moving their head. Further, in an exemplary embodiment, the viewing headset 702 may be configured to be relatively compact. For example, when secured to the user 770, the viewing headset 702 may extend by a distance 772 of no more than 12 cm from eyes of the user 770. In an exemplary embodiment, the distance 772 may be 12 cm. Combined with facilitation of imaging of the external objects 776 by rotatable adjustment of the front panel 716, the viewing headset 702 may be configured so as not to strain muscles of the user 770 (e.g., in a neck of the user 770), thereby increasing an overall comfort level and user experience and satisfaction.

FIGS. 8A-8H show another embodiment of a viewing headset 800 with a front panel 802 and a lens frame body 804. The viewing headset 800 may have at least some components that have a similar function and/or structure to the previously described headsets. Therefore, redundant description is omitted for concision.

FIGS. 9A-9B show another embodiment of a front panel 900 and a lens frame body 902 in an unfolded configuration.

In this way, a viewing headset is provided for use with a range of mobile display devices, such as smartphones and tablet computers. Specifically, the viewing headset may include a headset lens frame having a lens positioned therein and a front securement strap adjustable to secure various mobile display devices to a front panel or slot of the headset lens frame. In some examples, the lens may be positioned within a secondary lens frame which may be adjusted (e.g., slidably adjusted) towards or away from the front panel or slot. In additional or alternative examples, the front panel may be coupled to a lens frame body of the headset lens frame via a hinge, such that the front panel may be rotatably adjusted within a line of sight of the viewing headset. A technical effect of configuring the viewing headset as described is that user experience may be improved via facile adjustment of relative positioning of the lens (e.g., via adjustment of the secondary lens frame) and the mobile display device (e.g., via adjustment of the front panel or slot).

In some examples, no software may be installed (or may be installable) on the viewing headset. In additional or alternative examples, at least some components of the viewing headset, such as the lens body frame and/or the front panel or slot of the headset lens frame may be formed from sturdy, yet lightweight, biodegradable materials (e.g., cardboard, biodegradable plastics, and the like).

A technical effect of selecting such biodegradable materials, in combination with eliminating software and the hardware on which the software may be installed, is that a relatively compact, affordable, and environmentally friendly viewing headset may be constructed as compared to viewing headsets including software installed thereon or formed from bulkier and/or more expensive materials. Further, the viewing headset may not be limited to any given software or hardware implementations included on a given mobile display device, such that numerous mobile display device configurations may be readily accommodated.

The invention will be further described in the following paragraphs. In one example, a viewing headset is provided that comprises a headset lens frame, comprising: a lens frame body; a front panel coupled to the lens frame body via a hinge, the hinge permitting limited rotation of the front panel; and a front strap coupled to the lens frame body and the front panel, the front strap sized and positioned to removably secure a display device to the front panel; and a lens positioned within the lens frame body. A first example of the viewing headset further includes wherein the limited rotation of the front panel is rotation of the front panel between a first position, in which a first viewing plane of the front panel is normal to an optical axis of the lens, and a second position, in which a second viewing plane of the front panel forms an acute angle with the first viewing plane of the front panel in the first position. A second example of the apparatus, optionally including the first example of the apparatus, further includes wherein the acute angle is 32° or less. A third example of the apparatus, optionally including one or more of the first and second examples of the apparatus, further comprises a secondary lens frame in which the lens is positioned, the secondary lens frame slidably engaged with the lens frame body and slidably adjustable along an optical axis of the lens. A fourth example of the apparatus, optionally including one or more of the first through third examples of the apparatus, further includes wherein the front strap is coupled to the lens frame body and the front panel at a first edge of the front panel coincident with a rotational axis of the hinge, and wherein the front strap is further coupled to the front panel at a second edge of the front panel parallel and opposite to the first edge of the front panel. A fifth example of the apparatus, optionally including one or more of the first through fourth examples of the apparatus, further includes wherein the lens frame body and the front panel are independently formed from cardboard and/or a biodegradable plastic. A sixth example of the apparatus, optionally including one or more of the first through fifth examples of the apparatus, further includes wherein the headset lens frame is 18 cm or less in width by 19 cm or less in height by 9 cm or less in length. A seventh example of the apparatus, optionally including one or more of the first through sixth examples of the apparatus, further includes wherein the lens is positioned about 10 cm from the front panel.

In another example, a viewing headset system is provided that comprises a viewing headset, comprising: a slot configured to receive a mobile device, the slot comprising a first securement strap configured to secure the mobile device in position within the slot and in a line of sight of the viewing headset; and a lens positioned in the line of sight of the viewing headset, wherein the slot is rotatable about a rotational axis normal to the line of sight of the viewing headset, rotation of the slot being constrained to maintain a display of the mobile device within the line of sight of the viewing headset upon the mobile device being received by the slot. A first example of the system further includes wherein no software is installed on the viewing headset. A second example of the system, optionally including the first example of the system, further comprises a second securement strap configured to secure the viewing headset to a user such that a line of sight of the user coincides with the line of sight of the viewing headset. A third example of the system, optionally including one or more of the first and second examples of the system, further includes wherein the lens is positioned within a single aperture sized to accommodate at least a portion of each of a left field of vision of a user and a right field of vision of the user upon the viewing headset being secured to the user. A fourth example of the system, optionally including one or more of the first through third examples of the system, further includes wherein the viewing headset further comprises: an interior volume; and an opening fluidly coupling the interior volume to an external environment, a plane of the opening being positioned parallel to and below the line of sight of the viewing headset and between the lens and the slot. A fifth example of the system, optionally including one or more of the first through fourth examples of the system, further includes wherein the opening is sized to permit access of a stylus or at least one finger of a user to the interior volume. A sixth example of the system, optionally including one or more of the first through fifth examples of the system, further includes whereupon securement of the viewing headset to a user, the viewing headset extends no more than 12 cm from eyes of the user. A seventh example of the system, optionally including one or more of the first through sixth examples of the system, further includes wherein the system further comprises a light source mechanically coupled to the viewing headset. An eighth example of the system, optionally including one or more of the first through seventh examples of the system, further includes wherein the light source is operable to emit light into an external environment, beams of the emitted light intersecting with a field of view of a camera of the mobile device.

In yet another example, a method, is provided that comprises securing a headset to a head of a user; securing a mobile display device within the headset and in a line of sight of the user; manually accessing a mobile camera application of the mobile display device, the mobile camera application including instructions in non-transitory memory of the mobile display device, the instructions executable to perform image recognition on images received at a camera of the mobile display device; and rotatably adjusting an angle of the mobile display device within the line of sight of the user to increase a number of external objects recognizable by the mobile camera application in the images received at the camera. A first example of the method further includes wherein the mobile camera application includes augmented reality functionality. A second example of the method, optionally including the first example of the method, further comprises, responsive to a lens of the headset being out of focus with a display of the mobile display device, slidably adjusting the lens towards or away from the mobile display device.

FIGS. 1-5 and 7A-9B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A viewing headset, comprising:
   a headset lens frame, comprising:
      a lens frame body with a lens positioned therein;
      a front panel coupled to the lens frame body via a hinge, the hinge permitting rotation of the front panel within a predetermined angular range; and a display attachment device coupled to the lens frame body and the front panel, the display attachment device configured to removably secure a display device to the front panel;

wherein the hinge is positioned above a display slot that is configured to receive the display device; and wherein the front panel includes a protrusion that is positioned below the display slot and mates with an opening in the lens frame body to guide the front panel through rotation along an arc.

2. The viewing headset of claim 1, wherein the predetermined angular range of the front panel is rotation of the front panel between a first position, in which a first viewing plane of the front panel is normal to an optical axis of the lens, and a second position, in which a second viewing plane of the front panel forms an acute angle with the first viewing plane of the front panel in the first position.

3. The viewing headset of claim 1, further comprising a light source coupled to an upper side of the lens frame body via a light coupling.

4. The viewing headset of claim 1, further comprising a secondary lens frame in which the lens is positioned, the secondary lens frame slidably engaged with the lens frame body and slidably adjustable along an optical axis of the lens.

5. The viewing headset of claim 1, wherein the display attachment device is coupled to the lens frame body and the front panel at a first edge of the front panel coincident with a rotational axis of the hinge, and wherein the display attachment device is further coupled to the front panel at a second edge of the front panel parallel and opposite to the first edge of the front panel.

6. The viewing headset of claim 1, wherein the lens frame body and the front panel each include one or more folds that form an interior volume.

7. The viewing headset of claim 6, wherein the lens frame body and the front panel are independently formed from one or more of cardboard and a biodegradable plastic.

8. The viewing headset of claim 1, wherein the display attachment device includes a front strap sized and positioned to removably secure the display device to the front panel.

9. The viewing headset of claim 8, wherein the front strap attaches to a front adjustment bracket that is configured to tighten and loosen the front strap.

10. The viewing headset of claim 1, wherein the predetermined angular range is ≤32°.

11. A viewing headset system, comprising:
a viewing headset, comprising:
a front panel including a slot configured to receive a mobile device, the slot comprising a first securement strap configured to secure the mobile device within the slot and in a line of sight of the viewing headset; and a lens positioned in the line of sight of the viewing headset;

wherein the front panel includes a hinge that is rotatable about a rotational axis within a range in which the line of sight intersects the front panel;

wherein rotation of the front panel is constrained within a predetermined angular range via the hinge to maintain a display of the mobile device within the line of sight of the viewing headset upon the mobile device being received by the slot; and wherein the hinge is positioned above a display slot that is configured to receive the display device; and wherein the front panel includes a protrusion that is positioned below the display slot and mates with an opening in the lens frame body to guide the front panel through rotation along an arc.

12. The viewing headset system of claim 11, wherein no software is installed on the viewing headset.

13. The viewing headset system of claim 11, further comprising a second securement strap configured to secure the viewing headset to a user such that a line of sight of the user coincides with the line of sight of the viewing headset.

14. The viewing headset system of claim 11, wherein the lens is positioned within a single aperture sized to accommodate at least a portion of each of a left field of vision of a user and a right field of vision of the user upon the viewing headset being secured to the user.

15. The viewing headset system of claim 11, wherein the viewing headset further comprises:
an interior volume; and
an opening extending from the interior volume to an external environment, a plane of the opening being positioned parallel to and below the line of sight of the viewing headset and between the lens and the slot.

16. The viewing headset system of claim 15, wherein the opening is sized to permit access of a stylus or at least one finger of a user to the interior volume.

17. The viewing headset system of claim 11, further comprising a light source mechanically coupled to the viewing headset.

18. The viewing headset system of claim 17, wherein the light source is operable to emit light into an external environment, beams of the emitted light intersecting with a field of view of a camera of the mobile device.

19. The viewing headset system of claim 11, wherein the predetermined angular range is ≤5°.

20. The viewing headset of claim 11, wherein the hinge is positioned on an upper side of the front panel and wherein the front panel includes a protrusion that is positioned in a lower side of the front panel and mates with an opening in a lens frame body to guide the front panel through rotation.

* * * * *